(12) United States Patent
Hiroishi et al.

(10) Patent No.: US 7,164,830 B2
(45) Date of Patent: Jan. 16, 2007

(54) NONLINEAR OPTICAL FIBER AND OPTICAL SIGNAL PROCESSING APPARATUS USING THE OPTICAL FIBER

(75) Inventors: Jiro Hiroishi, Tokyo (JP); Ryo Miyabe, Tokyo (JP); Ryuichi Sugizaki, Tokyo (JP); Naomi Kumano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/128,209

(22) Filed: May 13, 2005

(65) Prior Publication Data

US 2005/0213907 A1     Sep. 29, 2005

Related U.S. Application Data

(63) Continuation of application No. PCT/JP03/016758, filed on Dec. 25, 2003.

(30) Foreign Application Priority Data

| Aug. 7, 2003 | (JP) | 2003-288524 |
| Oct. 10, 2003 | (JP) | 2003-351538 |

(51) Int. Cl.
   *G02B 6/02*     (2006.01)
   *G02B 6/024*    (2006.01)

(52) U.S. Cl. ............... 385/123; 385/122; 385/127
(58) Field of Classification Search ............... None
    See application file for complete search history.

(56) References Cited

U.S. PATENT DOCUMENTS 6,347,174 B1 * 2/2002 Onishi et al. ............... 385/122
6,804,441 B1 * 10/2004 Arai et al. ............... 385/123
7,006,742 B1 * 2/2006 Takahashi et al. ............... 385/122
2002/0135866 A1 * 9/2002 Sasaoka et al. ............... 359/334

(Continued)

FOREIGN PATENT DOCUMENTS

EP     1 209 497 A2     5/2002

(Continued)

OTHER PUBLICATIONS

M. Onishi et al. Highly nonlinear dispersion-shifted fibers and their application to broadband wavelength converter. Optical Fiber Technology 4, 204-214, Apr. 1998.*

(Continued)

*Primary Examiner*—Rodney Bovernick
*Assistant Examiner*—Mike Stahl
(74) *Attorney, Agent, or Firm*—Oblon, Spivak, McClelland, Maier & Neustadt, P.C.

(57) ABSTRACT

The present invention provides an optical fiber of a high nonlinear characteristic which has low dispersion values in a wide wavelength region in the vicinity of a wavelength of 1550 nm. An excellent optical signal processing apparatus is realized by using this optical fiber, such as an optical wavelength converter and a pulse compressor. The optical fiber has characteristics; a dispersion slope at the wavelength of 1550 nm of −0.01 to 0.01 ps/nm$^2$/km, an absolute value of dispersion at the wavelength of 1550 nm of 10 ps/nm/km or less, and a nonlinear constant at the wavelength of 1550 nm of 30×10$^{-10}$/W or more. A polarization retaining maintaining members are uniquely applied.

41 Claims, 12 Drawing Sheets

U.S. PATENT DOCUMENTS

2003/0095767 A1* 5/2003 Hiroishi et al. ............. 385/126
2003/0161600 A1* 8/2003 Mukasa ...................... 385/127
2004/0234216 A1* 11/2004 Okuno et al. ............... 385/122
2004/0240815 A1* 12/2004 Kuksenkov et al. ........ 385/123

FOREIGN PATENT DOCUMENTS

JP          2002-207136          7/2002

OTHER PUBLICATIONS

J. Hiroishi et al. Dispersion slope controlled HNL-DSF with high gamma of 25/W/km and band conversion experiment using this fiber. 2002 European Conference on Optical Communication, vol. 5, pp. 1-2, Sep. 2002.*

M. Takahashi et al. Low-loss and low-dispersion-slope highly nonlinear fibers. Journal of Lightwave Technology, vol. 23 No. 11, pp. 3615-3624, Nov. 2005.*

* cited by examiner

NONLINEAR OPTICAL FIBER AND OPTICAL SIGNAL PROCESSING APPARATUS USING THE OPTICAL FIBER

TECHNICAL FIELD

The present invention relates to an optical fiber excellent in non-linearity and an optical signal processing apparatus using this optical fiber.

BACKGROUND ART

In recent years, higher speed transmission, larger transmission capacity, and longer transmission distance have been demanded in optical signal transmission system. In order to meet these demands, signal processing techniques for increasing the processing speed and transmission distance of an optical signal have been sought.

As one of the optical signal processing techniques, there is a method of converting an optical signal into an electric signal, subjecting the converted electric signal to signal processing and converting the processed electric signal back into an optical signal. However, this method is unsuitable for high-speed signal processing because the method involves an extra step of converting an optical signal into an electric signal and then converting the electric signal back into an optical signal.

On the other hand, there is an all-optical signal processing technique which processes an optical signal as it is. Since this processing technique treats an optical signal directly as an optical signal without converting the optical signal into an electric signal, high-speed optical signal processing becomes possible.

In the all-optical signal processing technique, there are a method of utilizing a nonlinear optical phenomenon which occurs in an optical fiber for transmitting an optical signal, a method of utilizing a nonlinear phenomenon which occurs in an optical waveguide of material with high non-linearity, and the like.

The former all-optical signal processing technique utilizing the nonlinear optical phenomenon which occurs in an optical fiber, have been particularly attracting attentions in recent years because the technique allows high-speed processing and, at the same time, a low transmission loss. Examples of the nonlinear phenomenon which occurs in an optical fiber include four-wave mixing, self-phase modulation, cross-phase modulation, Brillouin scattering, and the like. Optical signal processing techniques such as wavelength conversion utilizing the four-wave mixing, pulse compression and waveform shaping utilizing the self-phase modulation have already been reported.

The four-wave mixing is a phenomenon in which, when two or more lights of two or more having different wavelengths propagates in an optical fiber, light of new wavelengths is generated with a specific rule by the nonlinear phenomenon. In the above-described optical signal processing techniques, this phenomenon in which light of new wavelengths is generated is utilized in wavelength conversion. In addition, this wavelength conversion utilizing the four-wave mixing has an advantage that a large number of signal wavelengths can be collectively subjected to wavelength conversion.

In addition, with shaping a waveform deteriorated during transmission by utilizing the self-phase modulation or the cross-phase modulation, all-optical signal processing, which allows a long distance transmission, is realized.

In order to actually realize the optical signal processing techniques of the wavelength conversion and the waveform shaping utilizing the nonlinear phenomena such as the four-wave mixing and the self-phase modulation in an optical fiber described above, an optical fiber which has a large nonlinear phenomena, that is, a high non-linearity is required as the optical fiber.

As the optical fiber having high non-linearity, there is one example proposed by Japanese unexamined publication No. 2002-207136 (Patent Reference 1). Characteristics at a wavelength of 1550 nm of this optical fiber are shown in detail in FIGS. 14 and 16 of the Patent Reference 1.

Dispersion Value

In the case of the optical fiber disclosed in the Patent Reference 1, a dispersion slope value at the wavelength of 1550 nm is $-0.267$ ps/nm$^2$/km to $+0.047$ ps/nm$^2$/km which show a large variation, and also, a dispersion value is $-103.2$ ps/nm/km to $+3.3$ ps/nm/km which show a very large absolute value in a lower limit thereof as large as 103.2 ps/nm/km.

That is, an optical fiber, which has a small variation in dispersion slope and small absolute value in dispersion at the wavelength of 1550 nm, is not provided. Therefore, an optical fiber, which has a small absolute value in dispersion over a wide wavelength region in the vicinity of the wavelength of 1550 nm, has not been provided.

Therefore, it is a first object of the present invention to provide an optical fiber which has a low dispersion value while having a high nonlinear characteristic over a wide wavelength region in the vicinity of the wavelength of 1550 nm. In addition, the present invention is to provide an optical signal processing apparatus using such an optical fiber.

Polarization Retainability Maintainability

In addition to the high nonlinear characteristic, the optical signal processing utilizing the nonlinear phenomenon is also affected by a polarization state significantly. Therefore, a polarization retaining maintaining characteristic of an optical fiber to be used is also important.

As an optical fiber which has the high non-linearity and also has the polarization retaining maintaining characteristic, there is a polarization retaining maintaining optical fiber proposed by the Patent Reference 1.

A transverse cross sectional view of this polarization retaining maintaining optical fiber is shown in FIG. 15 of the Patent Reference 1, and characteristic values thereof is shown in FIG. 16 of the Patent Reference 1.

In the case of the polarization retaining maintaining optical fiber disclosed in the Patent Reference 1, for example, positions of stress imparting members provided on opposite sides of a core, more specifically, positions of both the stress imparting members with respect to the core are not clearly indicated, and it is not clearly indicated to which degree a space interval between them should be set. Thus, there is a problem in that it is difficult to adjust polarization cross talk and a beat length in manufacturing this polarization retaining maintaining optical fiber. More specifically, there is a problem in that it is difficult to reduce the polarization cross talk to a desired allowable value.

Therefore, it is a second object of the present invention to easily manufacture and provide a polarization retaining maintaining optical fiber which has polarization cross talk of a desired small value, and is excellent in non-linearity and preferable for optical signal processing utilizing the nonlinear optical phenomenon. In addition, it is also the second object of the present invention to provide an optical wavelength converter using this polarization retaining maintaining optical fiber.

Transmission Loss

An optical fiber, which can cause the nonlinear phenomenon of a large magnitude, is obtained by increasing a nonlinear constant $n_2/A_{\textit{eff}}$ ($n_2$: nonlinear refractive index coefficient, $A_{\textit{eff}}$: effective area) of an optical fiber. The nonlinear constant can be increased by using a material with a high nonlinear refractive index, reducing a mode field diameter of the optical fiber, or increasing a density of light to be transmitted.

A basic structure of an optical fiber comprising quartz-silica glass as a main component is constituted by a core of silica glass with a refractive index increased by germanium doping and a cladding of silica glass having a refractive index lower than that of the core, the cladding being provided on the periphery of the core.

As a quantity of germanium doped in the silica glass is increased, a nonlinear refractive index of the silica glass increases, and a refractive index thereof also increases. In addition, a mode field diameter can be reduced by increasing a difference in refractive index between the core and the cladding. Therefore, by doping a large quantity of germanium in the core, the nonlinear refractive index of the core increases, and the mode field diameter can be reduced. Thus, an optical fiber having a high nonlinear constant is obtained.

However, for obtaining an optical fiber with a high nonlinear constant, in a case where a large quantity of germanium is doped in the core to increase its non-linear refractive index and reduce the mode field diameter, a problem occurs in that a transmission loss of the optical fiber significantly increases. In general, when germanium is doped in an optical fiber, a transmission loss of the optical fiber in a wavelength band of 1550 nm increases. In particular, the increase in transmission loss of the optical fiber is remarkable, when a large quantity of germanium is doped in a core.

When the transmission loss of the optical fiber increases, even if the nonlinear constant is high, a development efficiency of the nonlinear phenomenon is deteriorated due to the large transmission loss. This can be explained by the following expressions (1) and (2).

A nonlinear phase shift ΦNL in the self-phase modulation, which is a parameter indicating non-linearity, is represented by the following expression (1).

$$\Phi NL = (2\pi/\lambda) \cdot (n_2/A_{\textit{eff}}) \cdot I \cdot L_{\textit{eff}} \quad (1)$$

In the expression, $n_2$ is a nonlinear refractive index of an optical fiber, $A_{\textit{eff}}$ is an effective area of the optical fiber, I is an intensity of light, and $L_{\textit{eff}}$ is an effective length of the optical fiber.

In the above expression, $n_2/A_{\textit{eff}}$ is a nonlinear constant.

The effective length $L_{\textit{eff}}$ is represented by the following expression (2).

$$L_{\textit{eff}} = [1 - \exp(-aL)]/a \quad (2)$$

In the expression, L is a length of the optical fiber, and a is a transmission loss of the optical fiber.

It is seen from the above expressions (1) and (2) that, when the transmission loss a of the optical fiber increases, the effective length $L_{\textit{eff}}$ of the optical fiber decreases, and the nonlinear phase shift ΦNL also decreases.

Therefore, as an optical fiber used for the optical signal processing which utilizes the nonlinear phenomenon in the optical fiber, the low transmission loss is required as well as a high nonlinear constant. However, such an optical fiber having a high nonlinear constant and also a low transmission loss has not been found.

It is a third object of the present invention to provide an optical fiber which is devised under the above-described circumstance and has both a high nonlinear constant and a low transmission loss. 20040714

Efficiency

Moreover, in order to efficiently perform the optical signal processing which utilizes the nonlinear phenomenon, it is necessary to take into account several parameters, such as an absolute value of a wavelength dispersion value, a bending loss, a transmission loss, a length of an optical fiber, a nonlinear constant, a wavelength, and a correlation among them. It is a fourth object of the present invention to provide an optical fiber, which can efficiently perform the optical signal processing which utilizes the nonlinear phenomenon, with taking into account the correlation of these parameters.

It is a general object of the present invention to provide an optical fiber, which is appropriate for the optical signal processing utilizing the nonlinear phenomenon, and an optical signal processing apparatus which uses such an optical fiber, with taking into account the above-described several parameters comprehensively.

SUMMARY OF THE INVENTION

An optical fiber of a first aspect in accordance with the present invention is characterized in that a dispersion slope at a wavelength of 1550 nm is −0.01 to 0.01 ps/nm²/km, preferably −0.005 to 0.005 ps/nm²/km, an absolute value of dispersion at the wavelength of 1550 nm is 10 ps/nm/km or less, and a nonlinear constant at the wavelength of 1550 nm is $30 \times 10^{-10}$/W or more, preferably $40 \times 10^{-10}$/W or more.

According to the above optical fiber, it becomes possible to provide an optical fiber which has a small variation in dispersion values and a small absolute value of dispersion in a wide wavelength region including the wavelength of 1550 nm, for example, S-band (1460 to 1530 nm), C-band (1530 to 1565 nm), and L-band (1565 to 1625 nm).

In addition, a dispersion value does not vary significantly with respect to an operating wavelength in a wide wavelength region, and optical signal processing in various wavelengths can be performed with one optical fiber. Further, with dispersion slope of −0.01 to 0.01 ps/nm²/km, preferably −0.005 to 0.005 ps/nm²/km, a variation of dispersion values is small in a wide wavelength region, and satisfactory optical signal processing utilizing the nonlinear optical phenomenon can be performed.

Incidentally, when an absolute value of a dispersion slope increases to 0.01 ps/nm²/km or more, a variation of dispersion values becomes relatively large with respect to different wavelengths in the vicinity of the wavelength of 1550 nm. This is unsuitable for WDM transmission in a wide wavelength region.

When the nonlinear constant is $30 \times 10^{-10}$/W or more, preferably $40 \times 10^{-10}$/W or more, an optical fiber having high non-linearity is obtained.

Further, in an embodiment of the optical fiber of the first aspect, the optical fiber is characterized in that a cut-off wavelength λc is 1450 nm or less, and the effective area $A_{\textit{eff}}$ is 12 μm² or less, preferably 10 μm² or less.

According to the above optical fiber, the optical fiber can be operated as a single mode optical fiber. When the cut-off wavelength λc is 1450 nm or less, it becomes possible to use the optical fiber of the present invention with respect to a wide wavelength region including the S-band, the C-band, and the L-band.

When the effective area $A^{eff}$ is set to 12 µm² or less, preferably 10 µm² or less, it becomes possible to obtain a high nonlinear constant.

Here, the nonlinear constant is represented by the following expression (3).

Note that, in the following expression (3), for a measured wavelength λc, $n_2$ indicates a nonlinear refractive index in an optical fiber, and $A_{eff}$ indicates an effective area of the optical fiber.

$$\text{Nonlinear constant} = n_2/A_{eff} \quad (3)$$

From the above expression (3), to increase the non-linear constant of the optical fiber, it is necessary to increase the nonlinear refractive index $n_2$ or reduce the effective area $A_{eff}$.

However, $n_2$ cannot be increased easily because it is a value depending upon a material. Thus, it is realistic to make a value of the effective area $A_{eff}$ of the optical fiber as small as possible.

In an optical fiber described according to the present invention, a higher nonlinear constant is obtained by setting the effective area $A_{eff}$ of the optical fiber to 12 µm² or less, preferably 10 µm² or less. With this setting of $A_{eff}$, an optical fiber with a value of the nonlinear constant at the wavelength of 1550 nm of $30 \times 10^{-10}$/W or more, more preferably $40 \times 10^{-1}$/W or more can be obtained.

In an embodiment of the optical fiber of the first aspect of the invention, the absolute value of dispersion at the wavelength of 1550 nm is set to 5 ps/nm/km or less.

According to the above optical fiber, an optical fiber which exhibits a higher non-linearity at an operating wavelength can be obtained more surely.

Moreover, in an embodiment of the optical fiber of the first aspect of the invention, a variation range (difference between the maximum value and the minimum value) of dispersion in a longitudinal direction of the optical fiber at any wavelength from 1510 to 1590 nm is 1 ps/nm/km or less, more preferably 0.2 ps/nm/km or less in the whole span of an operating length of one optical fiber. This optical fiber can be effectively used in a wavelength converter or the like.

In this application, the above-described variation range of a dispersion means a variation range of dispersion values measured by a dispersion distribution meter in the whole span of an optical fiber having a practical length. It is possible to measure a distribution of dispersion values of the optical fiber with, for example, a dispersion distribution meter which utilizes a system studied by Mollenauer.

In an embodiment of the optical fiber of the first aspect of the invention, the optical fiber includes: a first core which has a refractive index higher than that of pure silica; a second core which is provided on an outer periphery of the first core and has a refractive index lower than that of pure silica; and a cladding which is provided on an outer periphery of the second core and has a refractive index lower than that of the first core and higher than that of the second core, wherein an outer diameter D1 of the first core is 2 to 5 µm, and a ratio Da=D1/D2 of the outer diameter D1 of the first core and an outer diameter D2 of the second core is 0.3 or more, more preferably 0.4 or more and 0.7 or less. Here, pure silica means silica which does not includes a dopant for modifying refractive index, such as fluorine or germanium.

According to the above optical fiber, an optical fiber with a low dispersion slope can be obtained by adjusting the ratio Da=D1/D2 of the outer diameter D1 of the first core and the outer diameter D2 of the second core. In other words, by fabricating the optical fiber with such a structure, an optical fiber which has a small effective area $A_{eff}$, a low cut-off wavelength λc, and a small value of a dispersion slope, can be obtained.

Moreover, in an embodiment of the optical fiber of the first aspect of the invention, a relative refractive index difference Δ1 between the first core and the cladding is 2.0 to 5.0%, more preferably 2.4 to 4.0%, and a relative refractive index difference Δ2 between the second core and the cladding is −1.4 to −0.7%, more preferably −1.2 to −0.8%.

According to the above optical fiber, an optical fiber which has high non-linearity, a low dispersion slope, and the cut-off wavelength λc of 1450 nm or less, can be manufactured stably while keeping high productivity.

In addition, in an embodiment of the optical fiber of the first aspect of the invention, a refractive index distribution profile of the first core is an α-power profile, and α is 3.0 or more, preferably 6.0 or more.

In the above optical fiber, a dispersion slope can be reduced, and the effective area $A_{eff}$ of the optical fiber can also be reduced. Consequently, an optical fiber with high non-linearity can be obtained.

The optical signal processing apparatus of the present invention is realized by using the optical fiber of the first aspect of the invention.

According to such an optical signal processing apparatus, optical signal processing of stable performance is possible in a wide wavelength range.

Moreover, in an embodiment of the optical signal processing apparatus, the optical signal processing apparatus is an optical wavelength converter. According to the present invention, an optical wavelength converter excellent in a wavelength conversion characteristic can be provided.

In addition, in an embodiment of the optical signal processing apparatus, the optical signal processing apparatus is a pulse compressor. According to the present invention, a pulse compressor excellent in a pulse compression characteristic can be provided.

Therefore, an optical fiber, which has low dispersion values stably in a wide wavelength region including the wavelength of 1550 nm, can be provided. In addition, an optical signal processing apparatus using this optical fiber, more specifically, an optical wavelength converter and a pulse compressor having excellent performance can be provided.

An optical fiber of a second aspect in accordance with the present invention is a silica glass polarization maintaining optical fiber including a core, a cladding provided on an outer periphery of the core, and two stress imparting members provided on opposite sides of the core, characterized in that a nonlinear coefficient at a wavelength of 1550 nm is 15/W/Km or more, a cut-off wavelength λc is 1500 nm or less, dispersion at the wavelength of 1550 nm is −9 ps/nm/km to 9 ps/nm/km, a dispersion slope at the wavelength of 1550 nm is 0.029 ps/nm²/km or less, and polarization cross talk at the wavelength of 1550 nm is −20 db/100 m or less.

According to the above polarization maintaining optical fiber, a polarization maintaining optical fiber which has polarization cross talk within a desired allowable range, can be manufactured. In addition, an optical fiber which is excellent in non-linearity and is preferable for optical signal processing utilizing the nonlinear optical phenomenon, can be provided.

In an embodiment of the optical fiber of the second aspect of the invention, the core comprises a first core located in a central part and a second core provided on an outer periphery of the first core, the second core has a refractive index lower than that of the first core, the cladding has a refractive index higher than that of the second core and lower than that of the first core, a relative refractive index difference Δ1 of the first core with respect to the cladding is 1.8% or more, a relative refractive index difference Δ2 of the second core with respect to the cladding is −0.1% or less, a ratio R/D1 of a space interval R between the stress imparting members and a diameter D1 of the first core is 2.5 to 10, and a ratio D1/D2 of the diameter D1 of the first core and a diameter D2 of the second core is 0.3 to 0.8.

In an embodiment of the optical fiber of the second aspect of the invention, the ratio R/D1 of the interval R between the stress imparting members and the diameter D1 of the first core is 2.5 to 3.7.

It is preferable to set R/D1 to 2.5 to 3.7 because sufficiently small polarization cross talk within a desired value is obtained more surely.

In an embodiment of the optical fiber of the second aspect of the invention, the interval R between the stress imparting members is 7 μm to 17 μm.

By defining the interval R between the stress imparting members located on the opposite sides of the core in this way, an optical fiber which has a small polarization cross talk within the desired value, can be manufactured more surely.

In an embodiment of the optical fiber of the second aspect of the invention, the cut-off wavelength λc is 1400 nm or less, the dispersion slope at the wavelength of 1550 nm is 0.019 ps/nm²/km or less, a beat length at the wavelength of 1550 nm is 5 mm or less, and a bending loss in a diameter 10 mm at the wavelength of 1550 nm is 0.1 dB/m or less.

According to the above optical fiber, a polarization maintaining optical fiber, which has not only polarization cross talk but also a beat length within a desired allowable range, can be manufactured easily. An optical fiber excellent in non-linearity and preferable for optical signal processing utilizing the nonlinear optical phenomenon can be provided.

In addition, in an embodiment of the optical fiber of the second aspect of the invention, the ratio D1/D2 of the diameter D1 of the first core and the diameter D2 of the second core is 0.4 to 0.7, the nonlinear coefficient at the wavelength of 1550 nm is 20/W/km or more, the dispersion at the wavelength of 1550 nm is −1 ps/nm/km to 1 ps/nm/km, and the relative refractive index difference Δ1 of the first core with respect to the cladding and the relative refractive index difference Δ2 of the second core with respect to the cladding satisfy the following relation.

(Δ2)<−0.52·(Δ1)+1

According to the above polarization maintaining optical fiber, an optical fiber excellent in non-linearity and preferable for optical signal processing utilizing the nonlinear optical phenomenon, which can reduce an absolute value of dispersion of the polarization maintaining optical fiber and can reduce the cut-off wavelength λc to 1400 nm or less, can be manufactured easily.

Moreover, in an embodiment of the optical fiber of the second aspect of the invention, the relative refractive index difference Δ2 of the second core with respect to the cladding is −0.8% or less, and the relative refractive index difference Δ3 of the first core with respect to the second core is 3.5% or more.

According to the above polarization maintaining optical fiber, an optical fiber excellent in non-linearity and preferable for optical signal processing utilizing the nonlinear optical phenomenon, which has a small dispersion slope of the polarization maintaining optical fiber and can reduce the cut-off wavelength λc to 1400 nm or less, can be provided.

In an embodiment of the optical fiber of the second aspect of the invention, the stress imparting members are made of silica glass doped with boron, the cladding is made of silica glass doped with fluorine, and a relative refractive index difference Δ4 of the stress imparting members with respect to the cladding is −0.1% or less or 0.1% or more.

According to the above polarization maintaining optical fiber, in the case where optical fibers are connected to each other, positions of the stress imparting members can be easily confirmed, and thus the connection operation is facilitated.

The optical wavelength converter of the present invention is characterized by using the above-described optical fiber.

According to the optical wavelength converter, an optical wavelength converter excellent in a wavelength conversion characteristics in wavelength conversion characteristics can be provided.

As described above, according to the polarization retaining maintaining optical fiber of the present invention, a polarization retaining maintaining optical fiber, which can reduce polarization cross talk to a desired small value, and is excellent in non-linearity and preferable for optical signal processing utilizing the nonlinear optical phenomenon, can be manufactured easily. In addition, an optical wavelength converter excellent in an optical wavelength conversion characteristics in optical wavelength conversion characteristics can be provided.

An optical fiber of the third aspect of the present invention is an optical fiber including a core and a cladding, characterized in that a nonlinear constant $n_2/A_{eff}$ is $20\times10^{-10}$/W or more, an absolute value of wavelength a dispersion at a wavelength of 1550 nm is 20 ps/nm/km or less, a bending loss in a diameter of 5 mm at the wavelength of 1550 nm is 0.1 dB/m or less, and an outer diameter of the cladding is 70 to 110 μm.

In the above optical fiber of the present invention, the nonlinear constant $n_2/A_{eff}$ is $20\times10^{-10}$/W or more, whereby high non-linearity is obtained, and efficient optical signal processing utilizing the nonlinear phenomenon becomes possible. More preferably, the nonlinear constant $n_2/A_{eff}$ is $40\times10^{-10}$/W or more.

In addition, the absolute value of the dispersion at a wavelength of 1550 nm is 20 ps/nm/km or less, whereby the optical fiber can be used preferably for wavelength conversion utilizing the nonlinear phenomenon, and waveform shaping such as optical 2R and optical 3R. Preferably, the absolute value of the dispersion at the wavelength of 1550 nm is 2 ps/nm/km or less.

Further, the bending loss in the diameter of 5 mm at the wavelength of 1550 nm is 0.1 dB/m or less, whereby it is possible to wind the optical fiber compactly. Preferably, the bending loss is 0.05 dB/m or less.

Moreover, the outer diameter of cladding is 70 to 110 μm, whereby a low transmission loss can be realized.

If the outer diameter of cladding exceeds 110 μm, a transmission loss increases. On the other hand, if the outer diameter of cladding is less than 70 μm, strength of the optical fiber deteriorates, reliability declines, and the transmission loss also increases. The outer diameter of cladding exceeding 100 μm or less than 70 μm is not preferable.

Note that, although an optical fiber with the outer diameter of cladding of 125 μm is widely used, when germanium is doped in a first core located in a central part of the optical fiber at a high concentration to increase the nonlinear constant to $20\times10^{-10}$/W or more and reduce the absolute value of the dispersion at the wavelength of 1550 nm to 20 ps/nm/km or less, the transmission loss increases in the optical fiber with the outer diameter of cladding of 125 µm. On the other hand, it has been found that, for example, if the outer diameter of cladding is reduced to as small as 90 µm, it is possible to reduce the transmission loss without spoiling a magnitude of the nonlinear constant. The present invention has been devised under such knowledge.

By doping germanium in the first core at a high concentration, reducing the absolute value of the dispersion at the wavelength of 1550 nm to 20 ps/nm/km or less, and reducing the diameter of cladding from 125 µm to 90 µm in this way, the transmission loss decreases. This mechanism is not clearly understood, but it is inferred that this is because a phenomenon as described below occurs.

That is, as more germanium is doped in silica glass, a refractive index increases, and a softening temperature of the silica glass falls. Consequently, in a high nonlinear optical fiber, in which germanium is doped at a high concentration to set the refractive index of the first core extremely high, compared with the case of a normal conventional optical fiber for a transmission pathline, a softening temperature of the first core becomes substantially lower than a softening temperature of the cladding of pure silica glass.

An optical fiber is manufactured by preparing a large diameter glass preform having the same sectional refractive index profile as that of an objective optical fiber, and wire-drawing the preform through heating and melting to reduce the diameter of the preform to a predetermined outer diameter of the optical fiber. In this process of wire drawing, respective steps to be followed are softening of the preform, reducing the outer diameter of the glass preform to a fiber diameter, and cooling and hardening the optical fiber with the predetermined diameter.

It is considered that, when the glass preform is softened, since the glass preform is heated to a high temperature sufficient for softening the cladding, the first core, for which a softening temperature is set low by doping germanium at a high concentration, is exposed to a temperature higher than a temperature necessary for softening the first core. Defects are caused in the core due to this high temperature and tension at the time of the wire drawing, which increases a transmission loss. While, it is considered that, if the cladding is thin by reducing the outer diameter of cladding, the first core is cooled faster so that a time while the first core is being left at the high temperature is shortened. Consequently, the defects decrease, and the transmission loss is not deteriorated.

In addition, concerning the cooling and hardening step, the cladding of silica glass with a high softening temperature is hardened first earlier than the first core, for which germanium is doped at a high concentration to set the softening temperature low, and then the core is hardened. Thus, it is inferred that large distortion occurs between the core and the cladding, which causes the increase in the transmission loss.

In particular, it is considered that, when germanium is doped in the first core at a high concentration in order to obtain high non-linearity, the transmission loss increases due to the above distortion. Here, it is considered that, if the outer diameter of the cladding is reduced so that the thickness of the cladding decreases, the cooling of the first core with respect to the cladding is made relatively faster compared with the time when the diameter of cladding is large, and a difference in times necessary for hardening the first core and the cladding is reduced. In addition, it is considered that a change in a gross volume of the cladding at the time of cooling is suppressed by reducing a volume of the cladding. It is considered that, consequently, an amount of distortion between the first core and the cladding decreases, and the transmission loss is reduced.

Note that the optical fiber of the present invention, wherein the refractive index of the first core is set high, the absolute value of the dispersion at the wavelength of 1550 nm is set to 20 ps/nm/km or less, and the bending loss in the diameter of 5 mm at the wavelength of 1550 nm is set to 0.1 dB/m or less, has characteristics that distribution of light intensity more concentrates in the first core, as compared with a dispersion compensation compensating optical fiber (DCF) wherein the refractive index of the first core is set high and the dispersion at the wavelength of 1550 nm is set negatively large to −60 ps/nm/km or less. It is considered that, consequently, in the high nonlinear optical fibers to which the present invention is directed, influence of defects in the first core doped with germanium is large, as compared with the dispersion compensated optical fiber, and thus the transmission loss is improved significantly when reducing the defects.

The optical fiber in accordance with the present invention is fabricated by silica-based glass obtained by doping a dopant, which has effects of increasing a refractive index and also lowering a softening temperature, in the first core at a high concentration, whereby the nonlinear constant is large and the absolute value of dispersion at the wavelength of 1550 nm is 20 ps/nm/km or less in the optical fiber. As such a dopant, in particular, germanium is preferable.

In addition, in an embodiment of the optical fiber of the third aspect of the invention, it is preferable that the cut-off wavelength $\lambda c$ is 1350 nm or less. With the cut-off wavelength $\lambda c$ of 1350 nm or less, the optical fiber can be used for a wide wavelength region including the S-band and the C-band.

Moreover, in an embodiment of the optical fiber of the third aspect of the invention, it is preferable that the dispersion slope at the wavelength of 1550 nm is 0.019 ps/nm$^2$/km or less. With the dispersion slope of 0.019 ps/nm$^2$/km or less, it becomes possible to provide an optical fiber with a small change in a value of dispersion in the wavelengths of 1550 nm band, and satisfactory optical signal processing utilizing the nonlinear phenomenon can be performed in a wide wavelength region.

It is preferable that a range of a variation of dispersion in a longitudinal direction of an optical fiber at the wavelength of 1550 nm is 3 ps/nm/km or less in the whole span of an operating wavelength of one optical fiber. With the range of a variation of dispersion in the longitudinal direction of the optical fiber of 3 ps/nm/km or less, it becomes possible to perform optical signal processing utilizing the nonlinear phenomenon satisfactorily.

In addition, in order to provide a high nonlinear constant and also lower the transmission loss by setting the cladding diameter at a specific range while keeping a balance between them, it is preferable that the relative refractive index difference of the first core with respect to the cladding is 1.5% or more when the core has the first core located in a central part thereof. More preferably, the relative refractive index difference of the first core with respect to the cladding is 2.5% or more.

In this way, it is particularly preferable to set the relative refractive index difference of the first core with respect to the cladding to 2.5% or more because a short cut-off wavelength $\lambda c$ of 1350 nm or less, a high nonlinear constant of 20×10$^{-10}$/W or more, and a dispersion slope of 0.019 ps/nm$^2$/km or less can be obtained simultaneously.

In particular, when a core comprises a first core located in a central part thereof and a second core in a periphery of the first core, a cladding comprises silica-based glass having a refractive index close to that of pure silicate glass or pure silica, and a relative refractive index difference of the second core with respect to the cladding is set to −1.2 to −0.4%, an optical fiber having a large nonlinear constant and a small dispersion slope can be obtained.

In this case, it is preferable that a relative refractive index difference of the first core with respect to the second core is 3% or more.

In addition, when it is assumed that an outer diameter of the second core is D2 and an outer diameter of the first core is D1, D1/D2=Da is set to 0.3 to 0.7, it is possible to obtain an optical fiber having a further smaller dispersion slope and high non-linearity.

In an embodiment of the optical fiber of the third aspect of the invention, the optical fiber may be an optical fiber obtained by fusing fusion-splicing a single mode optical fiber or a dispersion shifted optical fiber with an outer diameter of 120 to 130 μm to one end or both ends of the high linear optical fiber, and applying heat treatment to the fused part(s).

When the cladding outer diameter is set to 70 to 110 μm, it becomes difficult to connect the optical fiber with other optical fibers in the field, and a connection loss increases. However, a single mode fiber or a dispersion shifted optical fiber with an outer diameter of 120 to 130 μm is fused fusion-spliced to the high nonlinear optical fiber of the present invention with centers thereof aligned in advance, and the fused part is subjected to heat treatment to fusion-splice the optical fibers, whereby an optical fiber, which is easily connected with other optical fibers in the field, can be obtained.

It is preferable to align the centers of the high nonlinear optical fibers in accordance with the present invention and the optical fiber with the outer diameter of 120 to 130 μm to be fused fusion-spliced. A connection loss can be reduced by aligning the centers of the respective optical fibers. In addition, it is preferable to subject the fused part to heat treatment after fusing fusion-splicing the optical fiber. A dopant of the core in the connection part is diffused and a mode field diameter is expanded by performing the heat treatment after fusing fusion-splicing. Consequently, a connection loss in the fused fusion-spliced part can be reduced.

In addition, in the optical fiber in accordance with the present invention, the cladding diameter is set to 70 to 110 μm, whereby an outer diameter of optical fiber including a resin cover coating layers can be reduced, and it is possible to wind the optical fiber compactly in a coil. A sub-system apparatus for, for example, optical 2R, optical 3R, or wavelength conversion, in which the optical fiber in accordance with the present invention is wound with a maximum winding diameter of 20 cm or less, more preferably 18 cm or less, has an advantage of compactness, as well as possibility of optical signal processing utilizing the high nonlinear phenomenon is possible.

An optical signal processing apparatus using this optical fiber of the third aspect of the present invention is provided.

In an optical fiber of a fourth aspect in accordance with the present invention, when it is assumed that $n_2/A_{e\!f\!f}$ is a nonlinear constant, a is a transmission loss, λ is a wavelength, and L is a length of the optical fiber, a value of $(2\pi/\lambda)(n_2/A_{e\!f\!f})[1-\exp(-aL)]/a$ satisfies a condition of 1/W or more in a range of λ of 1500 nm to 1600 nm, an absolute value of dispersion at a wavelength of 1550 nm is 30 ps/nm/km or less, and a bending loss in a diameter of 5 mm at the wavelength of 1550 nm is 0.5 dB/m or less.

In the optical fiber of the present invention, it is necessary to set the absolute value of dispersion at the wavelength of 1550 nm to 30 ps/nm/km or less. This is because, in the case of signal processing in the wavelengths of 1550 nm band, if the absolute value of dispersion exceeds 30 ps/nm/km, efficient optical signal processing cannot be performed.

In addition, it is necessary to set the bending loss in the diameter of 5 mm at the wavelength of 1550 nm is set to 0.5 dB/m or less. This is because, if the bending loss exceeds 0.5 dB/m, when the optical fiber is wound and housed in an optical signal apparatus, a transmission loss is increased. When the transmission loss is increased, an effective length of the optical fiber is reduced, and efficient optical signal processing cannot be performed as described later.

Moreover, when it is assumed that, when $n_2/A_{e\!f\!f}$ is a nonlinear constant, a is a transmission loss, λ is a wavelength, and L is a length of the optical fiber, a value of $(2\pi/\lambda)(n_2/A_{e\!f\!f})[1-\exp(-aL)]/a$ is required to satisfy a condition of 1W-1 or more in a range of λ of 1500 nm to 1600 nm. This is because efficient optical signal processing cannot be performed if the value of $(2\pi/\lambda)(n_2/A_{e\!f\!f})[1-\exp(-aL)]/a$ is less than 1/W.

A nonlinear phase shift ΦNL due to the self-phase modulation of the nonlinear phenomenon is represented by the following expression (1)(4).

$$\Phi NL=(2\pi/\lambda)(n_2/A_{e\!f\!f})IL_{e\!f\!f} \quad (1)(4)$$

Here, λ indicates a wavelength, $n_2/A_{e\!f\!f}$ indicates a nonlinear constant, I indicates a light intensity, $L_{e\!f\!f}$ indicates an effective length, $n_2$ indicates a nonlinear refractive index, and $A_{e\!f\!f}$ indicates an effective area. Moreover, the effective length $L_{e\!f\!f}$ is represented by the following expression (2)(5).

$$L_{e\!f\!f}=[1-\exp(-aL)]/a \quad (2)(5)$$

Here, a indicates a transmission loss, and L indicates a length of the optical fiber.

From the above expressions (1)(4) and (2)(5), the nonlinear phase shift is represented by the following expression (3)(6).

$$\Phi NL=(2\pi/\lambda)(n_2/A_{e\!f\!f})I[1-\exp(-aL)]/a \quad (3)(6)$$

From the above expression (3)(6), ΦNL/I in a case when the length of the optical fiber is 2 km and λ is 1550 nm is calculated as shown in FIG. 16.

It can be found that non-linearity of signal processing for waveform shaping is sufficient with an optical fiber of a dispersion of −1 ps/nm/km, a transmission loss of 0.37 dB/km, and a nonlinear constant of $n_2/A_{e\!f\!f}$ of $20\times10^{-10}$ for optical fiber length of 2 km. When $(2\pi/\lambda)(n_2/A_{e\!f\!f})[1-\exp(-aL)]/a$ at this point is calculated, it is about 14.9/W.

In addition, it can be considered that non-linearity of signal processing for wavelength conversion is sufficient with an optical fiber with an optical fiber length of 0.1 km, a dispersion of 0 ps/nm/km, a transmission loss of 0.48 dB/km, and a nonlinear constant of $n_2/A_{e\!f\!f}$ of $30\times10^{-1}$. When $(2\pi/\lambda)(n_2/A_{e\!f\!f})[1-\exp(-aL)]/a$ at these values is calculated, it is 1.09/W. That is, 1/W or more is required as a value of $(2\pi/\lambda)(n_2/A_{e\!f\!f})[1-\exp(-aL)]/a$.

When it is attempted to obtain an optical fiber with a high nonlinear constant by doping germanium in a core at a high concentration to increase a refractive index of the core, a problem occurs in that a transmission loss of the optical fiber is increased significantly. As more germanium is doped, the transmission loss of the optical fiber increases.

As it is seen from expression (3) or FIG. 1, when the transmission loss increases, even if the nonlinear constant is high, the nonlinear phase shift decreases due to the transmission loss, and efficient optical signal processing utilizing the nonlinear phenomenon cannot be performed. Therefore, it is necessary to select the nonlinear constant $n_2/A_{eff}$, the transmission loss a, and the optical fiber length L such that $(2\pi/\lambda)(n_2/A_{eff})[1-\exp(-aL)]/a$ is 1/W or more.

In addition, it is desirable that, in the optical fiber of the fourth aspect of the invention, $(2\pi/\lambda)(n_2/A_{eff})$ is 8 to 17/W/km, L is 0.5 to 30 km, and the transmission loss a is 0.2 to 0.6 dB/km in a range of $\lambda$ of 1500 nm to 1600 nm.

$(2\pi/\lambda)(n_2/A_{eff})$ is called a nonlinear coefficient $\gamma$. As seen from expression (1), when Y increased increases, the nonlinear phase shift increases so that the nonlinear phenomenon efficiently takes place.

It is difficult to obtain the sufficient nonlinear phenomenon at $(^2\pi/\lambda)(n_2/A_{eff})$ of less than 8/W/km. On the other hand, when $(2\pi/\lambda)(n_2/A_{eff})$ exceeds 17/W/km, since it is necessary to dope germanium in the core at a high concentration, the transmission loss a increases, and thus the effective length $L_{eff}$ significantly tends to decrease depending upon the transmission loss a in a range of optical fiber length L of 0.5 km or more. Thus, it becomes difficult to obtain large nonlinear phase shift, even if assuming a relatively long actual optical fiber length L.

In a range of optical fiber length less than 0.5 km and $(2\pi/\lambda)(n_2/A_{eff})$ of 17/W/km or less, the sufficient nonlinear phenomenon cannot be obtained. In addition, when the optical fiber length L exceeds 30 km, since the effective length $L_{eff}$ significantly tends to be small depending upon the transmission loss a, the large nonlinear phenomenon cannot be obtained, even if assuming a relatively long actual optical fiber length L.

In the optical fiber with $(2\pi/\lambda)(n_2/A_{eff})$ set to 8/W/km or more, since it is necessary to dope germanium in the core at a high concentration to some extent, it becomes difficult to manufacture the optical fiber with the transmission loss a set to less than 0.2 dB/km. In addition, when the transmission loss a exceeds 0.6 dB/km, since the effective length $L_{eff}$ decreases, the sufficient nonlinear phenomenon cannot be obtained.

Moreover, in an embodiment of the optical fiber of the fourth aspect of the invention, it is desirable that, in a range of $\lambda$ of 1500 nm to 1600 nm, $(2\pi/\lambda)(n_2/A_{eff})$ is 17 to 27/W/km, L is 0.01 to 10 km, and the transmission loss a is 0.4 to 2 dB/km.

When $(2\pi/\lambda)(n_2/A_{eff})$ is less than 17/W/km, in a ranges of optical fiber length L of 10 km or less and the transmission loss of 0.4 db/km or more, it becomes difficult to obtain the sufficient nonlinear phenomenon. In order to make $(2\pi/\lambda)(n_2/A_{eff})$ larger than 27/W/km, it is necessary to dope germanium in the core at a higher concentration. It, however, becomes more difficult to dope germanium in the core at a high concentration as $(2\pi/\lambda)(n_2/A_{eff})$ exceeds 27/W/km by a larger degree, and even if a core with germanium doped at a high concentration is obtained, since a softening temperature thereof is extremely low compared with silica of the cladding, the core easily causes distortion at the time of manufacturing and is easily broken, whereby manufacturability tends to be deteriorated.

When the optical fiber length is less than 0.01 km, the sufficient nonlinear phenomenon is not obtained. In addition, when the optical fiber length exceeds 10 km, in a range of transmission loss a of 0.4 dB/km or more, since the effective length $L_{eff}$ significantly tends to decrease depending upon the transmission loss a, it becomes difficult to obtain the large nonlinear phenomenon even if assuming a relatively long actual optical fiber length L.

In the optical fiber with $(2\pi/\lambda)(n_2/A_{eff})$ of 17/W/km or more, since it is necessary to dope germanium in the core at a high concentration, it becomes difficult to manufacture the optical fiber with the transmission loss a of the optical fiber of less than 0.4 dB/km. In addition, when the transmission loss a exceeds 2 dB/km, even if $(2\pi/\lambda)(n_2/A_{eff})$ is as large as 17/W/km, since the effective length $L_{eff}$ significantly tends to decrease, it becomes difficult to obtain the sufficient nonlinear phenomenon.

As described above, according to the present invention, an optical fiber, which can efficiently perform signal processing utilizing the nonlinear phenomenon, is obtained. Note that a compact and efficient optical signal processing apparatus is obtained by using the optical fiber of the present invention wound around at a maximum diameter of 16 cm or less and housed in the apparatus.

BRIEF DESCRIPTION OF THE DRAWINGS

FIGS. 1(A) and 1(B) show an embodiment of the optical fiber of the present invention, in which FIG. 1(A) shows a refractive index profile, and FIG. 1(B) is a sectional view showing a part of a cross section of the optical fiber;

EMBODIMENTS OF THE INVENTION

Figure 1A:
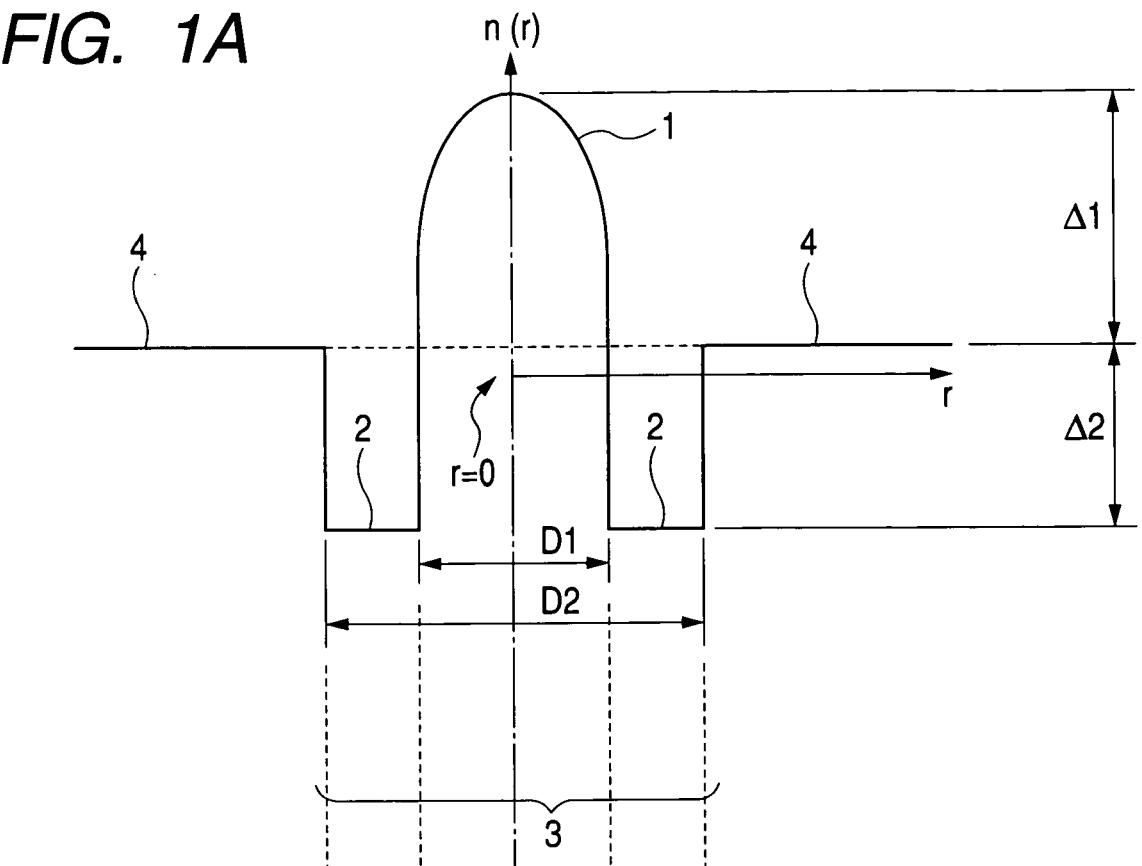

A: High Linear Optical Fiber of a Type Having a Low Dispersion Value Variation of Dispersion and a Low Dispersion Value Embodiments of an optical fiber of the present invention, and an optical wavelength converter and a pulse compressor using this optical fiber will be described in detail using the first to seventh embodiments.

The optical fiber in accordance with the present invention is an optical fiber which causes a nonlinear phenomenon with respect to input light in the vicinity of a wavelength of 1550 nm, with a dispersion slope at the wavelength of 1550 nm of −0.01 to 0.01 ps/nm²/km.

With the dispersion slope of −0.01 to 0.01 ps/nm²/km as described above, an optical fiber with a small variation of dispersion values in a wide wavelength region including the wavelength of 1550 nm and also a small absolute value of dispersion can be provided.

In addition, with the dispersion slope of −0.01 to 0.01 ps/nm²/km in a wide wavelength region, a dispersion value does not vary largely in a wide wavelength region including a wavelength of 1550 nm. Consequently, satisfactory optical signal processing utilizing the nonlinear optical phenomenon can be applied to the wide wavelength region including the wavelength of 1550 nm.

Incidentally, when an absolute value of a dispersion slope increases to 0.01 ps/nm²/km or more, a variation of dispersion values becomes relatively large with respect to different wavelengths in the vicinity of the wavelength of 1550 nm. Consequently, the dispersion slope is required to be −0.01 to 0.01 ps/nm²/km. Further, in order to further reduce the variation of dispersion values with respect to the wide wavelength region including the wavelength of 1550 nm, it is preferable that the dispersion slope is −0.005 to 0.005 ps/nm²/km.

In addition, it is also one of the characteristics of the optical fiber of the present invention that an absolute value of a dispersion value is 10 ps/nm/km or less, and a nonlinear constant at the wavelength of 1550 nm is $30 \times 10^{-10}$/W or more.

An optical fiber with high non-linearity can be obtained as described later by setting the nonlinear constant to $30 \times 10^{-1}$/W or more.

In addition, it is required that the cut-off wavelength λc is smaller with respect to operating wavelengths in the single mode optical fiber. Therefore, it is desirable that the cut-off wavelength waveform λc is 1450 nm or less. Since the cut-off wavelength λc is 1450 nm or less, it becomes possible to use the optical fiber with respect to a wide wavelength region including the S-band, the C-band, and the L-band.

Here, the cut-off wavelength λc means a fiber cut-off wavelength λc defined by the ITU-T (International Telecommunication Union) G.650. In addition, terms not specifically defined in this specification comply with definitions and measurement methods in ITU-T G.650.

Note that it is preferable that the effective area $A_{eff}$ is 12 μm² or less. It becomes possible to obtain a high nonlinear constant when setting the effective area $A_{eff}$ to 12 μm² or less.

In the nonlinear constant represented by the above-described expression (1)(3), it is necessary to increase the nonlinear refractive index $n_2$ of the optical fiber or reduce the effective cross-sectional area $A_{eff}$ as much as possible in order to increase the nonlinear constant, and it is actually necessary to reduce the effective area $A_{eff}$ as much as possible.

Therefore, in order to obtain an optical fiber with large non-linearity, it is necessary that the effective area $A_{eff}$ is small in a structure of the optical fiber. In addition, it is also necessary that an absolute value of dispersion in operating wavelengths is small. Therefore, it is desirable that an absolute value of a dispersion value at the wavelength of 1550 nm is 10 ps/nm/km or less, and it is more desirable that the absolute value of a dispersion is 5 ps/nm/km or less.

It becomes possible to obtain a high nonlinear constant by setting the effective area $A_{eff}$ to 12 μm² or less. More preferably, it becomes possible to obtain a higher nonlinear constant by setting the effective area $A_{eff}$ to 10 μm² or less. As a result, an optical fiber having a value of the nonlinear constant of $40 \times 10^{-10}$/W or more at the wavelength of 1550 nm can be obtained. 20040715

In addition, a range of a variation of dispersion values described in this specification can be measured by, for example, a dispersion profile meter utilizing the system studied by Mollenauer in the whole span of an optical fiber with a practical length as described above.

It is preferable that a variation range of dispersion values in a longitudinal direction of the optical fiber at any wavelength from 1510 to 1590 nm is 0.001 to 1 ps/nm/km in the whole span of an operating wavelength of one optical fiber.

The range of a variation of dispersion values in the longitudinal direction of the optical fiber is 1 ps/nm/km or less in the whole span of the operating wavelength of one optical fiber, whereby satisfactory optical signal processing utilizing the nonlinear phenomenon becomes possible. More preferably, the variation range of dispersion values in the longitudinal direction of the optical fiber at any wavelength from 1510 to 1590 nm is 0.2 ps/nm/km or less in the whole span of the operating wavelength of one optical fiber. The variation of dispersion values is 0.2 ps/nm/km or less in this way, whereby more satisfactory optical signal processing utilizing the nonlinear phenomenon becomes possible.

Incidentally, in order to actually control the variation of dispersion values in the longitudinal direction of the optical fiber, it is required that thicknesses of the core part and the cladding part are uniform in an optical fiber preform. More specifically, for example, in depositing soot, it is necessary to manage a material to be deposited according to, for example, an OVD method or a VAD method such that the material is deposited uniformly. When this optical fiber preform is extended elongated to a desired outer diameter, highly accurate extension elongation is required such that a difference of an outer diameter variation is 0.2% or less.

Figure 1B:
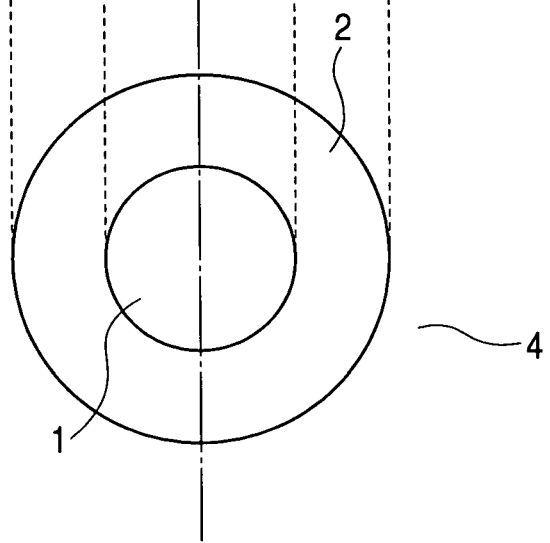

FIG. 1 shows one typical example of an optical fiber of a nonlinear dispersion shifted type in accordance with the present invention. FIG. 1A is a refractive index profile of this optical fiber, and FIG. 1B shows a part of a cross section thereof, that is, a first core 1 and a second core 2 which is provided on the outside of the first core. An outside line of a cladding 4, which is provided on the outside of this second core 2, is not shown.

As shown in FIG. 1A, this optical fiber includes: the first core 1 which has a refractive index higher than that of pure silica and has a refractive index profile of α power represented by the following expression (2); the second core which is provided on the outside of the first core 1 and has a refractive index lower than that of pure silica; and the cladding 4 which is provided on the outside of the second core 2. A ratio D1/D2 of an outer diameter D1 of the first core 1 and an outer diameter D2 of the second core 2 is of 0.3 or more and 0.8 or less.

Here, in this specification, α representing a shape of a refractive index profile is defined by the following expression (7).

$$n^2(r) = n_{c1}^2 \{1 - 2 \cdot \Delta 1 \cdot (2r/D1)^\alpha\} \quad (7)$$

provided that $0 \leq r \leq D1/2$

Here, r represents a position in a radial direction of the optical fiber, and n(r) represents a refractive index in the position r. In addition, $n_{c1}$ is a maximum refractive index of the first core 1.

In addition, it is assumed that the diameter D1 of the first core 1 is a length of a line between positions, where a refractive index is equal to that of the cladding 4, in the first core 1. Further, it is assumed that the diameter D2 of the second core 2 is a length of a line between positions, where a refractive index is ½ of Δ2, in a boundary area of the second core 2 and the cladding 4.

Moreover, a refractive index difference Δ1 of the first core 1 with respect to the cladding 4 and a relative refractive index difference Δ2 of the second core 2 with respect to the cladding 4 are represented by the following expressions (8) and (9).

$$\Delta 1 = \{(n_{c1} - n_c)/n_{c1}\} \cdot 100 \quad (8)$$

$$\Delta 2 = \{(n_{c2} - n_c)/n_{c2}\} \cdot 100 \quad (9)$$

Here, in the respective expressions, $n_{c1}$ is a maximum refractive index of the first core 1, $n_{c2}$ is a minimum refractive index of the second core 2, and $n_c$ is a refractive index of the cladding 4.

In a structure of the optical fiber shown in FIG. 1, it becomes possible to reduce a value of a dispersion slope by adjusting the ratio D1/D2 of the outer diameter D1 of the first core 1 to the outer diameter D2 of the second core 2.

Therefore, a change of the value of the dispersion slope through adjustment of the ratio D1/D2 of the outer diameter D1 of the first core to the outer diameter D2 of the second core will be explained using a simulation example in this structure of the optical fiber.

Figure 2:
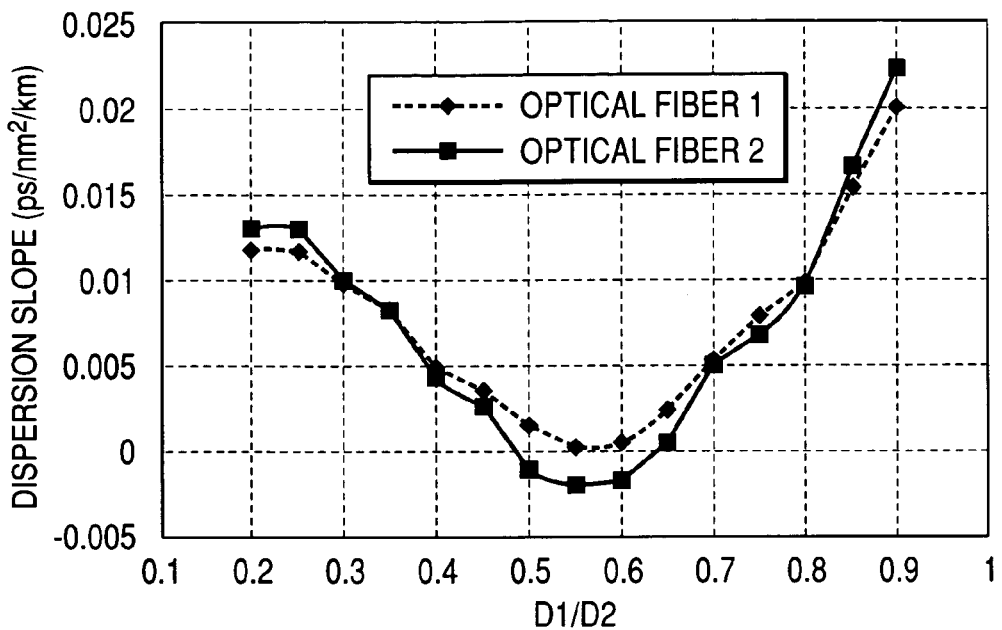
FIG. 2 is a graph showing a simulation result of a dispersion slope to D1/D2 of the optical fiber in FIG. 1.

FIG. 2 shows a relation between D1/D2 and a value of a dispersion slope at the time when dispersion is 0 ps/nm/km, in at the wavelength of 1550 nm. In addition, refractive index profiles of two types of optical fibers 1 and 2 used here are shown in table 1.

TABLE 1

|  | Δ1 | Δ2 | α |
|---|---|---|---|
| Optical fiber 1 | 2.8% | −1% | 8 |
| Optical fiber 2 | 2.3% | −1% | 7 |

As shown in FIG. 2, in the case where D1/D2 is less than 0.3, or in the case where D1/D2 has exceeded 0.8, the dispersion slope is larger than −0.01 to 0.01 ps/nm²/km.

In addition, as shown in FIG. 2, it becomes possible to set the value of the dispersion slope in a range of −0.005 to 0.005 ps/nm²/km by setting the ratio D1/D2 to 0.4 or more and 0.7 or less. Therefore, it is desirable to set the ratio D1/D2 of the outer diameter D1 of the first core and the outer diameter D2 of the second core to, preferably, 0.4 or more and 0.7 or less.

In general, a small effective area $A_{eff}$ is obtained by increasing a relative refractive index difference of a core with respect to a cladding. However, when simply increasing the relative refractive index difference of the core with respect to the cladding, a cut-off wavelength λc will shift to a long wavelength side, and it becomes difficult to secure single mode transmission in a wide wavelength band. On the other hand, by, for example, adopting the structure shown in FIG. 1, it is possible to realize both the small effective area $A_{eff}$ and the low cut-off wavelength λc.

In addition, it is preferable that the relative refractive index difference Δ1 of the first core 1 with respect to the cladding 4 is 2.0 to 5.0%, and the relative refractive index difference Δ2 of the second core 2 with respect to and pure silica, that is, the cladding 4 in this example, is −1.4 to −0.7%.

If the relative refractive index difference Δ1 of the first core 1 with respect to the cladding 4 is less than 2.0%, the effective area $A_{eff}$ increases, and non-linearity of the optical fiber becomes relatively small. In addition, when the relative refractive index difference Δ1 increases, the cut-off wavelength λc shifts to the long wavelength side. Therefore, when the relative refractive index difference Δ1 exceeds 5.0%, many requirements necessary must be considered to realize for obtaining the optical fiber having the cut-off wavelength λc suitable to realize the optical fiber for a single mode propagation must be considered.

As a result, productivity of the optical fiber is deteriorated.

In other words, when the relative refractive index difference Δ1 exceeds 5.0%, it becomes difficult to control the cut-off wavelength λc for bringing the optical fiber into the single mode. As a result, manufacturing conditions of the optical fiber becomes so strict to deteriorate productivity.

In addition, there is also a problem in that a value of the dispersion slope at the wavelength of 1550 nm increases, and when optical signal processing is performed, a variation of dispersion values with respect to different wavelengths in the vicinity of the wavelength of 1550 nm increases.

Further, when relative refractive index difference Δ2 of the second core 2 with respect to the cladding 4 is increased to the negative side, it is possible to reduce the dispersion slope while reducing an absolute value of a dispersion value at the wavelength of 1550 nm.

However, when the relative refractive index difference Δ2 is increased to the negative side, the cut-off wavelength λc shifts to a short wavelength side. Thus, if the relative refractive index difference Δ1 is of 2.0 to 5.0% and the relative refractive index difference Δ2 is of −1.4% to −0.7%, it becomes possible to reduce the dispersion slope to a value of −0.01 to 0.01 ps/nm²/km. In addition, it also becomes possible to reduce the cut-off wavelength λc to 1450 nm or less.

On the other hand, when the relative refractive index difference Δ2 falls below −1.4%, for example, since it is necessary to dope a large quantity of fluorine in the second core 2, manufacturing of an optical fiber becomes difficult and productivity is deteriorated.

Note that, more preferably, the refractive index difference Δ1 is 2.4 to 4.0%, and Δ2 is −1.2 to −0.8%. If the refractive index differences are in this range, an optical fiber with high non-linearity, a low dispersion slope, and the cut-off wavelength λc of 1450 nm or less can be manufactured with higher productivity, and stability of performance is further improved.

Moreover, it is possible to reduce the dispersion slope and also reduce the effective area $A_{eff}$ by forming a refractive index profile shape of the first core 1 in a refractive index profile of α-profile power and increasing this a. Therefore, it is desirable that the refractive index profile shape of the first core 1 is the refractive index profile of α-profile power, and α is 3 or more. More preferably, it is desirable that α is 6 or more.

Figure 3:
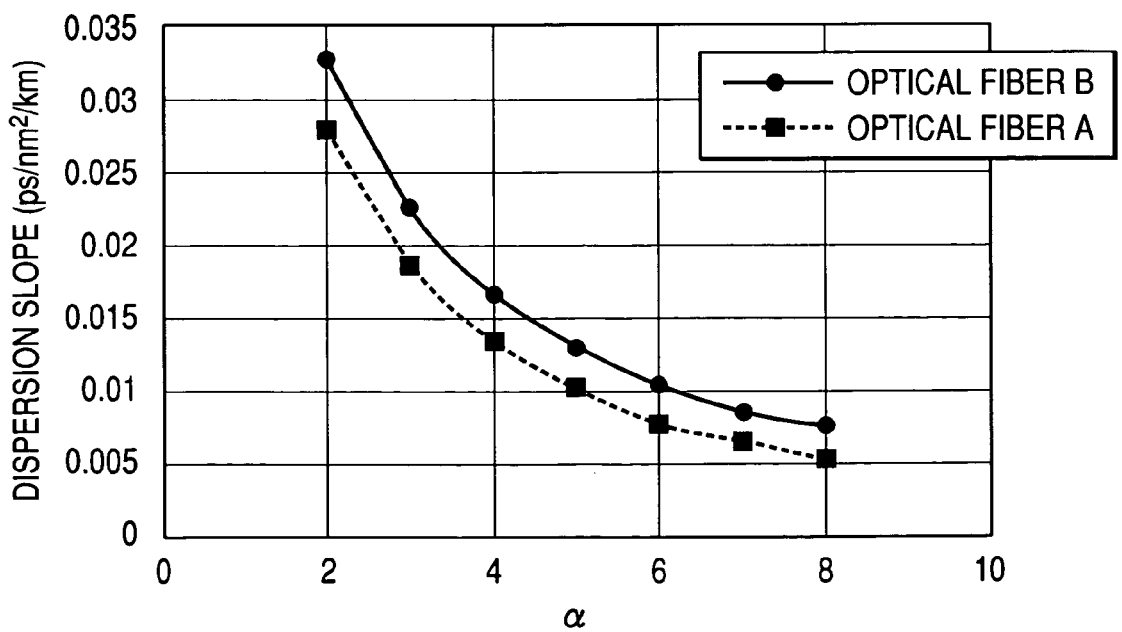
FIG. 3 is a graph showing a relation between $\alpha$ and the dispersion slope according to the simulation.
Figure 4:
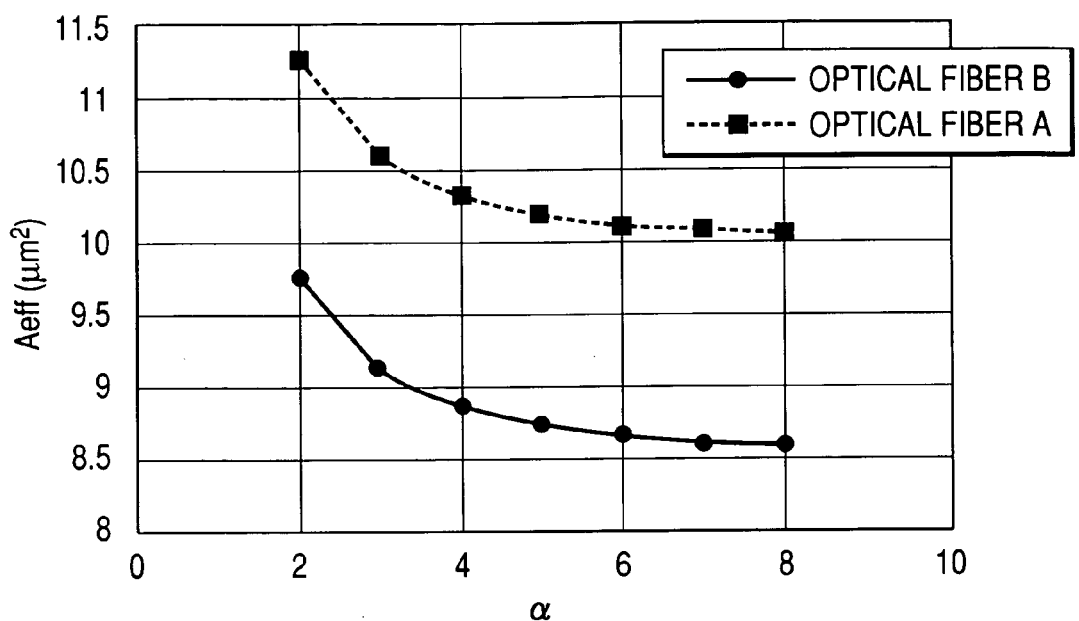
FIG. 4 is a graph showing a relation between $\alpha$ and an effective area $A_{eff}$ according to the simulation.

Here, using FIGS. 3 and 4 showing a simulation example of an example of the optical fiber of the present invention, it will be explained that it is advantageous to make a larger in order to, for example, reduce a dispersion slope.

FIG. 3 shows a relation between a and the dispersion slope, and FIG. 4 shows a relation between a and the effective area $A_{eff}$. In addition, structures of the two types of optical fibers A and B used here are shown in table 2.

TABLE 2

|  | Δ1 | Δ2 | Δ1/Δ2 |
|---|---|---|---|
| Optical fiber A | 2.60% | −0.80% | 0.5 |
| Optical fiber B | 3% | −1% | 0.4 |

As shown in FIG. 3, when a value of α is increased, the dispersion slope can be reduced. In particular, it is seen that, by increasing α from 2 to 3, a value of the dispersion slope can be reduced by about 0.009 ps/nm²/km in the optical fiber A and by about 0.01 ps/nm²/km in the optical fiber B. It is very effective for reduction of the dispersion slope to increase α in this way.

In addition, as shown in FIG. 4, the effective area $A_{eff}$ can be reduced by increasing a value of α. In particular, by increasing α from 2 to 3, the effective area $A_{eff}$ can be reduced by as much as about 8% in both the optical fiber A and the optical fiber B.

Incidentally, as a method for increasing α of the first core 1, there is a method of manufacturing a core preform with a large α refractive index profile shape α in advance, as a core preform having a refractive index higher than that of pure silica, according to the VAD method or the MCVD method. By subjecting a surface of the core preform manufactured by this method to HF etching or mechanical cutting grinding or the like, a value of α in the refractive index profile shape can be further increased.

In particular, in the case in which the above-described method is used, in manufacturing aspect, it is also relatively easy to increase α to 3 or more.

In addition, the dispersion slope can be further reduced as shown in FIG. 3, and the effective area $A_{eff}$ can also be reduced as shown in FIG. 4 by further increasing the value of α to 6 or more.

As shown in FIGS. 3 and 4, Wwhile the dispersion slope continues to decrease as α increases as shown in FIGS. 3 and 4 in a region in which α is 6 or more, the reduction of the effective area $A_{eff}$ is almost saturated. Therefore, it is preferable to increase α to at least 6 or more.

Embodiments

Table 3 shows values of parameters of optical fibers shown in embodiments A1 to A10 of the present invention and characteristic values thereof. Note that MFD in table 3 means a mode field diameter.

TABLE 3

|  | Δ1 % | Δ2 % | D1/D2 | α | Dispersion ps/nm/km | Slope ps/nm²/km | MFD μm | $A_{eff}$ μm² | λc nm | $n_2/A_{eff}$ /W |
|---|---|---|---|---|---|---|---|---|---|---|
| Measured wavelength |  |  |  |  | 1550 nm | 1550 nm | 1550 nm | 1550 nm |  | 1550 nm |
| Embodiment A1 | 3 | −1 | 0.35 | 4 | −3.96 | 0.0091 | 3.273 | 8.38 | 1183 | 69.2 × 10⁻¹⁰ |
| Embodiment A2 | 3 | −1 | 0.55 | 4 | −3.71 | −0.001 | 3.354 | 8.84 | 1255 | 65.5 × 10⁻¹⁰ |
| Embodiment A3 | 5 | −1.1 | 0.5 | 5 | −4.94 | 0.0057 | 2.759 | 6.04 | 1448 | 115.9 × 10⁻¹⁰ |
| Embodiment A4 | 4 | −0.9 | 0.6 | 4.5 | −9.1 | −0.0061 | 3.011 | 7.15 | 1382 | 90.9 × 10⁻¹⁰ |
| Embodiment A5 | 4 | −0.9 | 0.6 | 7 | −9.31 | 0.003 | 2.999 | 7.12 | 1385 | 91.3 × 10⁻¹⁰ |
| Embodiment A6 | 2.6 | −1 | 0.5 | 6 | 3.71 | 0.01 | 3.559 | 10.07 | 1261 | 49.7 × 10⁻¹⁰ |
| Embodiment A7 | 2 | −0.8 | 0.4 | 4 | −2.99 | 0.0087 | 3.875 | 11.88 | 1052 | 33.7 × 10⁻¹⁰ |
| Embodiment A8 | 2.9 | −1 | 0.35 | 7.5 | 0.705 | 0.0086 | 3.386 | 9.17 | 1275 | 58.5 × 10⁻¹⁰ |
| Embodiment A9 | 2.8 | −1 | 0.45 | 7 | 0.24 | 0.0018 | 3.51 | 9.73 | 1283 | 50.6 × 10⁻¹⁰ |
| Embodiment A10 | 2.8 | −1 | 0.55 | 5 | −3.48 | −0.0034 | 3.209 | 10.1 | 1295 | 48.1 × 10⁻¹⁰ |

In all the embodiments A1 to A10, at a wavelength of 1550 nm, an absolute value of dispersion is 10 ps/nm/km or less and a dispersion slope is −0.01 to 0.01 ps/nm²/km. In addition, a cut-off wavelength λc is 1450 nm or less, and an effective area $A_{eff}$ is 12 μm² or less.

Here, the characteristic values shown in the embodiments A1 to A7 are results obtained by a simulation, and the characteristic values shown in the embodiments A8 to A10 are obtained by actually manufacturing optical fibers and performing evaluation. Note that the characteristic values of the actually manufactured optical fibers substantially agreed with the results obtained by the simulation.

First, attention is directed to the embodiments A1 and A2. In order to facilitate comparison, values of dispersion at the wavelength of 1550 nm are set to of be substantially the same.

In the optical fiber of the embodiment A1, a ratio D1/D2 of an outer diameter D1 of a first core 1 to an outer diameter D2 of a second core 2 is 0.35. In the embodiment A2, D1/D2 is 0.55.

When the characteristic values obtained in both the optical fibers are compared, in the embodiment A2, the effective area $A_{eff}$ is larger than that in the embodiment A1, the cut-off wavelength λc is on a longer wavelength, and a value of the dispersion slope at the wavelength of 1550 nm shows a significantly smaller value. That is, it is inferred that, from the viewpoint of the dispersion slope, as D1/D2, 0.4–0.7 is more preferable to 0.3–0.8.

Next, the embodiments A4 and A5 will be compared in the same manner. In the embodiment A4, a refractive index profile shape of the first core is an α-power profile, and α is 4.5. On the other hand, in the embodiment A5, α is 7. When the characteristic values of the obtained optical fibers are compared, the dispersion slope at the wavelength of 1550 nm is smaller in the embodiment A5 than in the embodiment A4, and the effective area $A_{eff}$ also shows a smaller value. From this viewpoint, it is indicated that, as α, 6.0 or more is more preferable to 3.0 or more.

In addition, a variation in dispersion in a longitudinal direction of the optical fibers shown in the embodiments A8 and A9 were measured. As a result, in the embodiment A9, there was a variation in dispersion of 1.9 ps/nm/km in an overall length (the whole span) of 3 km at a measured wavelength of 1552 nm. This is equivalent to a variation in dispersion of 0.75 ps/nm/km when it is converted into a value per 1 km. In addition, concerning the optical fiber shown in the embodiment A9, there was a variation in dispersion of 0.15 ps/nm/km in an overall length of 15 km at a measured wavelength of 1556 nm. When this is converted into a value per 1 km in the same manner, it is considered that a variation in dispersion of 0.08 ps/nm/km was observed. In the case where this type of optical fiber is used in an optical signal processing apparatus, usually one optical fiber with a length of 10 m to 10 km is used. For example, when it is assumed that an operating wavelength of one optical fiber is 1 km, in the optical fiber of the embodiment A8, a longitudinal variation is 0.75 ps/nm/km in the whole span of the operating wavelength of the one optical fiber. In the optical fiber of the embodiment A9, the longitudinal variation is 0.08 ps/nm/km. Both the above variations are within an allowable range.

Table 4 shows values of parameters of optical fibers shown in comparative examples A1 to A5 and characteristic values thereof.

Note that, in table 4, MFD also means a mode field diameter.

cal fiber, as in the comparative example 1, a variation of dispersion values increases in the case where the optical fiber is used in a wide wavelength region, and more satisfactory optical signal processing utilizing the nonlinear phenomenon cannot be performed.

In the optical fiber of the comparative example A3, the relative refractive index difference Δ1 of the first core 1 with respect to the cladding 4 is 1.8%. In the obtained optical fiber, the effective area $A_{eff}$ becomes relatively large, and an optical fiber with a nonlinear constant γ of $30×10^{-10}$/W or more cannot be obtained.

In addition, in the optical fiber of the comparative example A4, a refractive index profile shape of the first core 1 is an α power-profile, and a value of α is 2.5. A value of a dispersion slope of the obtained optical fiber becomes relatively large, and as in the comparative examples 1 and 2, a variation of dispersion values in the case where the optical fiber is used in a wide wavelength region increases, and satisfactory optical signal processing utilizing the nonlinear phenomenon cannot be performed.

Moreover, in the comparative example A5, the relative refractive index difference Δ1 of the first core 1 and with the pure silica is 5.5%. In this optical fiber, the cut-off wavelength λc has shifted to a long wavelength side, and there is a problem when the optical fiber is used at the wavelength of 1550 nm.

Figure 5:
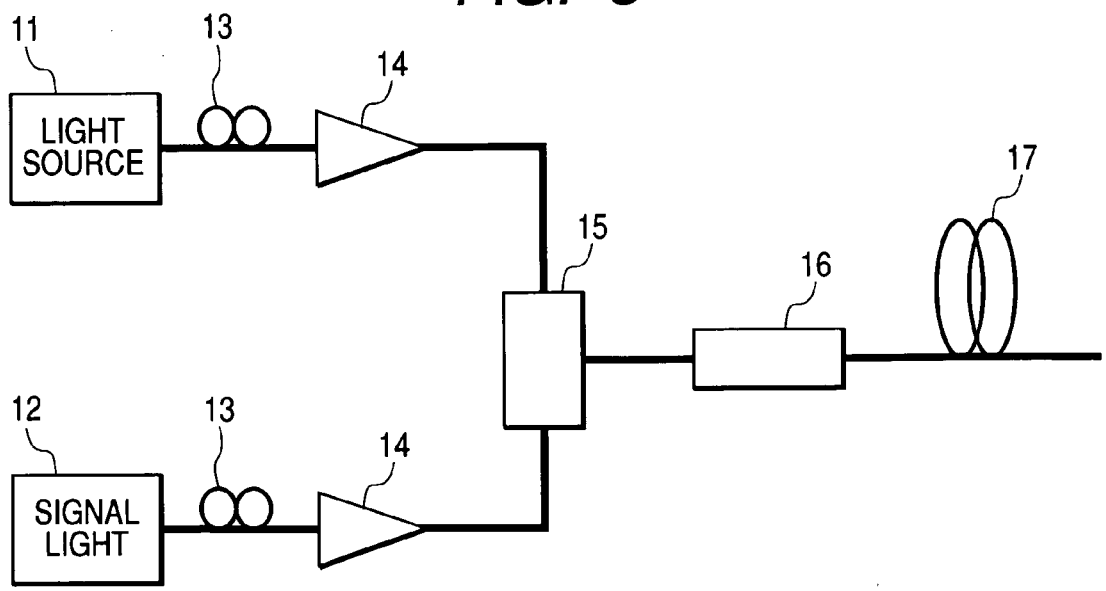
FIG. 5 is a schematic diagram showing an embodiment A in which the optical fiber of the present invention is used in a wavelength converter.

FIG. 5 shows an example of an optical wavelength converter as an example of an optical signal processing apparatus using the optical fiber of the present invention. According to this optical wavelength converter, it is possible to collectively convert wavelengths of signal light into other wavelengths.

Here, FIG. 5 will be explained briefly. Note that a wavelength, at which a dispersion value of the optical fiber 7 of the present invention is reduced to zero, is checked in advance.

First, pumping light (wavelength λs) in the vicinity of this wavelength at which a dispersion is zero, is emitted from a light source 11 to be coupled with a signal light 12 (wavelength λp). Then, the signal light is introduced into an optical fiber 17 of the present invention. In this case, a large

TABLE 4

| | Δ1 % | Δ2 % | D1/D2 | α | Dispersion ps/nm/km | Slope ps/nm²/km | MFD μm | $A_{eff}$ μm² | λc nm | $n_2/A_{eff}$ /W |
|---|---|---|---|---|---|---|---|---|---|---|
| Measured wavelength | | | | | 1550 nm | 1550 nm | 1550 nm | 1550 nm | | 1550 nm |
| Embodiment A1 | 3 | −0.8 | 0.25 | 4 | −4 | 0.018 | 3.376 | 8.85 | 1215 | $65.5 × 10^{-10}$ |
| Embodiment A2 | 3.2 | −0.5 | 0.5 | 4 | −2.14 | 0.0199 | 3.466 | 9.37 | 1393 | $61.9 × 10^{-10}$ |
| Embodiment A3 | 1.8 | −0.9 | 0.45 | 4 | 1.9 | 0.0085 | 4.037 | 12.68 | 1059 | $29.1 × 10^{-10}$ |
| Embodiment A4 | 3 | −1 | 0.48 | 2.5 | 1.02 | 0.0258 | 3.519 | 9.6 | 1254 | $67.7 × 10^{-10}$ |
| Embodiment A5 | 5.5 | −1 | 0.55 | 5 | −2.33 | 0.0148 | 2.729 | 5.95 | 1585 | $109.2 × 10^{-10}$ |

First, in the optical fiber of the comparative example A1, the ratio D1/D2 of the outer diameter D1 of the first core 1 and the outer diameter D2 of the second core 2 is 0.25. In this optical fiber, a value of a dispersion slope becomes relative large. Since a variation of dispersion values increases in the case where the optical fiber is used in a wide wavelength region, satisfactory optical signal processing utilizing the nonlinear phenomenon cannot be performed.

In the comparative example A2, the relative refractive index difference Δ2 of the second core 2 with respect to the cladding 4 is −0.5%. A value of a dispersion slope of the obtained optical fiber becomes relatively large. In this optinonlinear phenomenon referred as four wave mixing is caused in this optical fiber 17, and the signal light 12 is converted into a wavelength λ in the following expression (5)(10). Consequently, optical wavelength conversion is performed collectively.

$$\lambda = (\lambda p - \lambda s) + \lambda p \quad (5)(10)$$

In FIG. 5, reference numeral 13 denotes a polarization controller for aligning polarized waves, reference numeral 14 denotes an EDFA, that is, an erbium doped optical fiber amplifier (optical amplifier), reference numeral 15 denotes a coupler which couples an excitation pumping light (wavelength λs) from a light source with the signal light 12, and reference numeral 16 denotes a polarizer.

Figure 6:
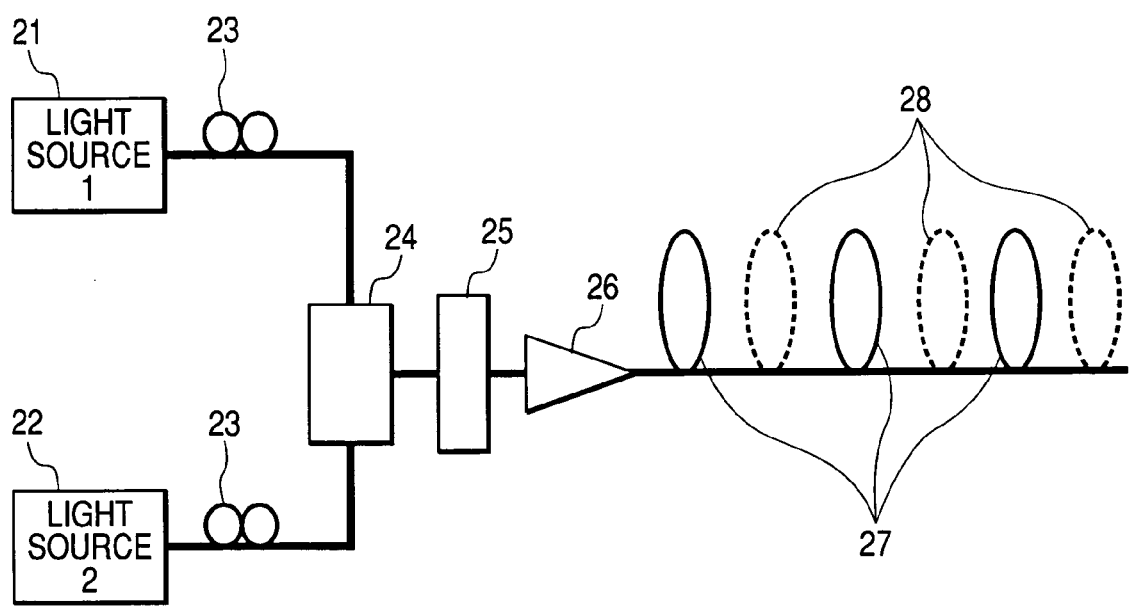
FIG. 6 is a schematic diagram showing an embodiment A of optical fiber of the present invention is used in a pulse compressor.

In addition, FIG. 6 shows an example of a pulse compressor using the optical fiber of the present invention. In FIG. 6, reference numerals 21 and 22 denote light sources of different wavelengths, respectively, reference numeral 23 denotes a polarization controller, and reference numeral 24 denotes a coupler. In addition, reference numeral 25 denotes a polarizer, and reference numeral 26 denotes an EDFA. Further, an optical fiber connecting from the light sources 21 and 22 to the EDFA 26, respectively, and an optical fiber denoted by the reference numeral 28 are normal conventional single mode optical fibers. Reference numeral 27 denotes the optical fibers of the present invention. A pulse compressor is constituted by alternately connecting the optical fibers 27 of the present invention and the single mode optical fibers 28 with predetermined lengths.

In FIGS. 5 and 6, only the optical wavelength converter or the pulse compressor is shown as the optical signal processing apparatus using the optical fiber of the present invention. However, it will be understood that the optical fiber of the present invention can be applied to, for example, a waveform shaper or the like as well.

Figure 7:
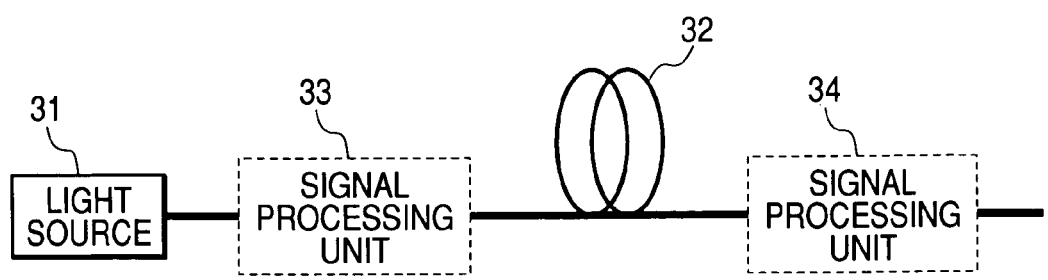
FIG. 7 is a schematic diagram showing an embodiment of an optical signal processing apparatus using the optical fiber of the present invention.

As shown in FIG. 7, the optical signal processing apparatus is constituted by at least a light source 31, an optical fiber 32 of the present invention, and signal processing units 33 and 34. The signal processing units are provided in the front or the rear of the optical fiber of the present invention or in both the front and the rear of the optical fiber of the present invention. As the optical signal processing apparatus, there are a wavelength converter and a pulse compressor.

B: High Nonlinear Optical Fiber of a Polarization Retaining Maintaining Type

Embodiments of the optical fiber of the polarization retaining maintaining type of the present invention and an optical wavelength converter using this polarization retaining maintaining optical fiber will be described in detail in association with FIGS. 8 to 16.

Figure 8:
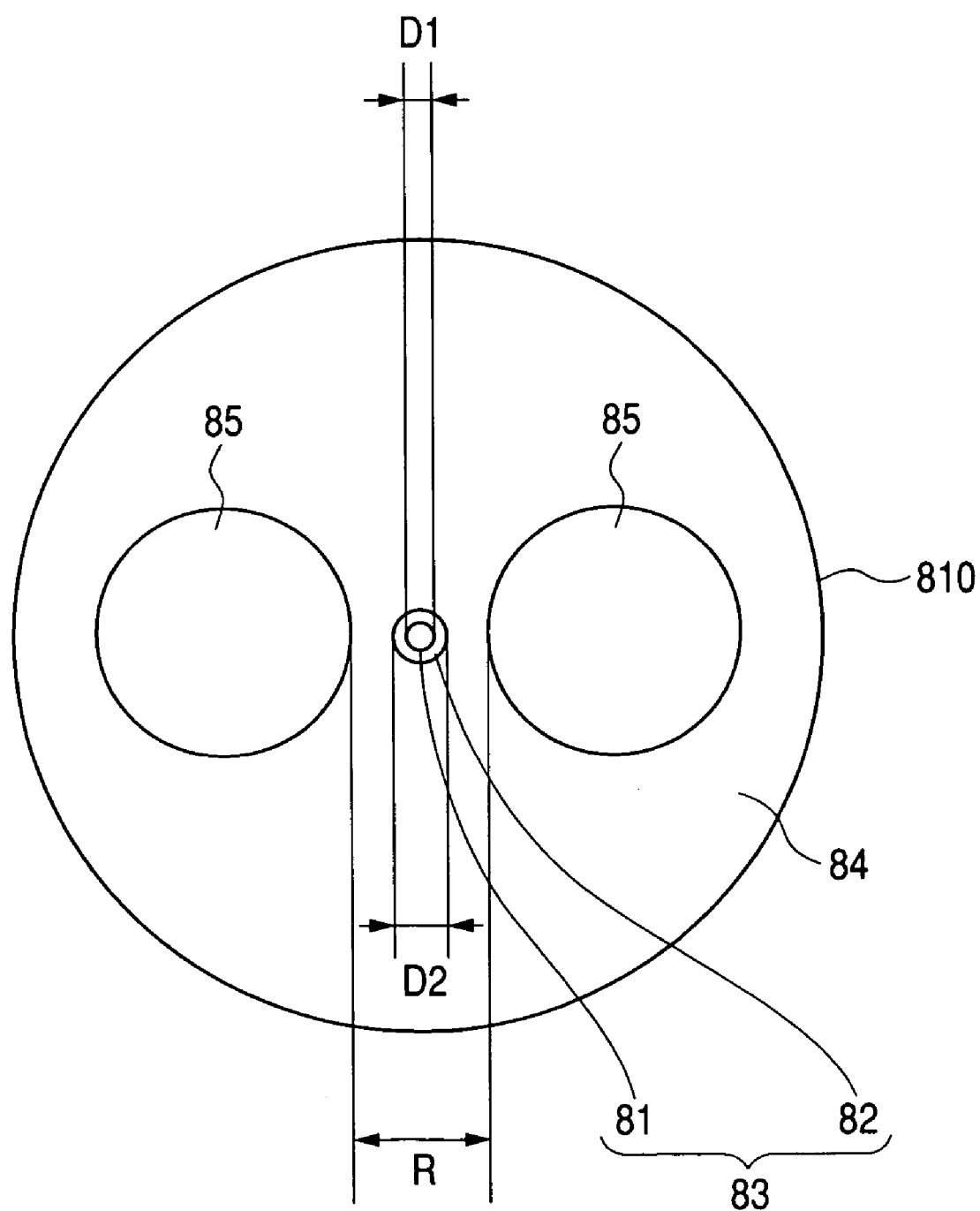
FIG. 8 is a schematic sectional view of a polarization retaining maintaining optical fiber of the present invention.
Figure 9:
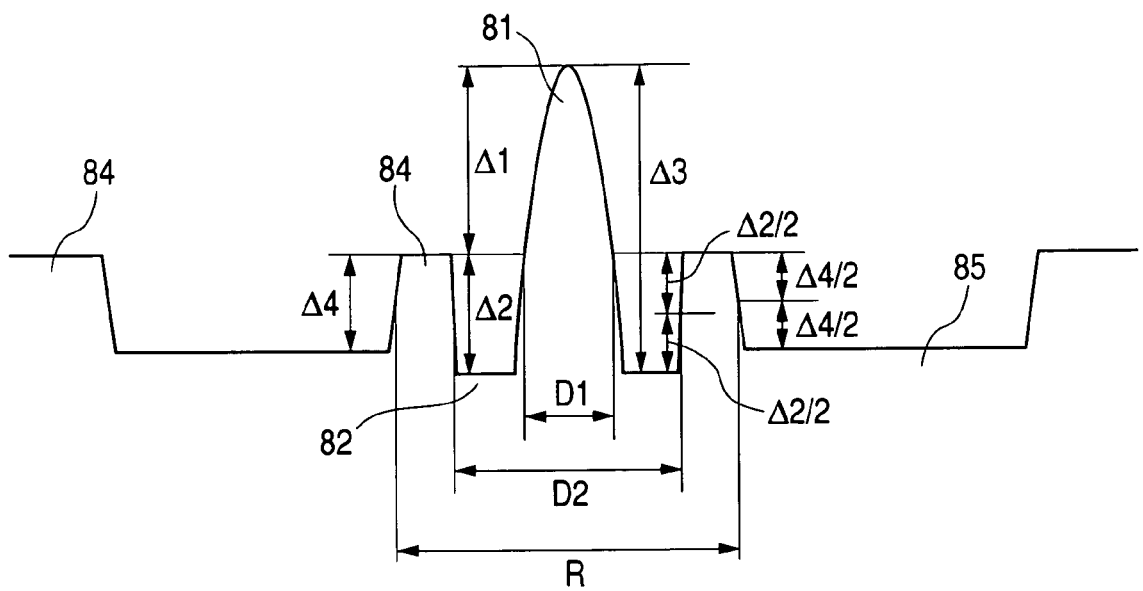
FIG. 9 is a diagram showing an example of a refractive index profile of the polarization retaining maintaining optical fiber in FIG. 8.

FIG. 8 shows a schematic sectional view of an embodiment of the optical fiber of the polarization retaining maintaining type, which is made of quartzsilica glass, of the present invention, and FIG. 9 shows an example of a refractive index profile of a polarization retaining maintaining optical fiber 810 in FIG. 8. As shown in FIG. 8, the polarization retaining maintaining optical fiber 810 of the present invention consists of includes a core 83 and a cladding 84 provided on an outer periphery of the core 83. This core 83 consists of a first core 81 located in a central part and a second core 82 provided on an outer periphery of the first core 81. In addition, two stress imparting members 85 are provided on opposite sides of the core 83. Although not shown in FIG. 8, usually, a resin coat of ultraviolet curing cured resin or the like is provided outside the cladding 84.

The relative refractive index difference Δ1 of the first core 81 with respect to the cladding 84 is required to be 1.8% or more. This is because a sufficient nonlinear phenomenon is not obtained when Δ1 is less than 1.8%. In order to induce the nonlinear phenomenon more surely, preferably, Δ1 is set to 2.5% or more, more preferably, 3.5% or more. Such a refractive index of the first core 81 can be realized by adding doping, for example, germanium in the quartzsilica glass.

In addition, it is preferable that the cladding 84 is made of quartzsilica glass added doped with fluorine. By adding doping fluorine in the cladding 84, it becomes easy to increase the relative refractive index difference Δ1 of the first core 81 with respect to the cladding 84, and a polarization retaining maintaining optical fiber having high nonlinearity is obtained.

Moreover, a softening temperature of the cladding 84 can be lowered by doping adding fluorine in the cladding 84. As s result, when an optical fiber preform is wire-drawn to obtain the polarization retaining maintaining optical fiber of the present invention, a wire-drawing temperature can be lowered, and it becomes easy to obtain a polarization retaining maintaining optical fiber with low transmission loss.

In addition, the second core 82 has a refractive index lower than that of the first core 81 and has a refractive index lower than the cladding 84. Moreover, the relative refractive index difference Δ2 of the second core 82 with respect to the cladding 84 is required to be −0.1% or less. Preferably, the relative refractive index difference Δ2 is set to −0.8% or less. This is because, if the relative refractive index difference Δ2 exceeds −0.1%, more specifically, if the relative refractive index difference Δ2 is −0.05%, a cut-off wavelength shifts to a long wavelength, and a dispersion slope increases.

Then, a refractive index of the second core 82 can also be reduced by doping adding fluoride fluorine in quartzsilica glass in the same manner as the cladding 84.

Although a nonlinear coefficient increases as the relative refractive index difference Δ1 of the first core 81 with respect to the cladding 84 is increased, a cut-off wavelength shifts to a long wavelength, and a dispersion slope also increases. Therefore, for example, in the case where the relative refractive index difference Δ1 of the first core 81 with respect to the cladding 84 is increased to 2.5% or more, it is particularly preferable to reduce the relative refractive index difference Δ2 of the second core 82 with respect to cladding 84 to −0.8% or less.

In addition, it is preferable that the relative refractive index difference Δ3 of the first core 81 with respect to the second core 82 is 3.5% or more. This is because, if Δ3 is 3.5% or more, it becomes easy to obtain the sufficient nonlinear phenomenon.

Note that the relative refractive index differences Δ1, Δ2, Δ3, and Δ4 are defined by the following expressions (11) to (14), respectively.

$$\Delta 1 = \{(n_{c1} - n_c)/n_{c1}\} \cdot 100 \tag{11}$$

$$\Delta 2 = \{(n_{c2} - n_c)/n_{c2}\} \cdot 100 \tag{12}$$

$$\Delta 3 = \{(n_{c1} - n_{c2})/n_{c1}\} \cdot 100 \tag{13}$$

$$\Delta 4 = \{(n_b - n_c)/n_b\} \cdot 100 \tag{14}$$

Here, in the respective expressions, $n_{c1}$ is a maximum refractive index of the first core 81, $n_{c2}$ is a minimum refractive index of the second core 82, $n_b$ is a refractive index of the stress imparting members 85, and $n_c$ is a refractive index of the cladding 84. In addition, it is assumed that $n_b$ is a maximum refractive index in the case in which Δ4 has a positive sign and is a minimum refractive index in the case in which Δ4 has a negative sign.

As an indicator indicating non-linearity, there is a nonlinear phase shift according to self-phase modulation. This nonlinear phase shift is represented by the following expression (15).

$$\Phi_{NL} = (2\pi/\lambda) \cdot (n_2/A_{eff}) \cdot I \cdot L_{eff} \tag{15}$$

Here, $\Phi_{NL}$ indicates the nonlinear phase shift, λ indicates a wavelength, $n_2$ indicates a nonlinear refractive index, $A_{eff}$ indicates an effective area, I indicates a light intensity, and $L_{eff}$ indicates an effective length. And, $(2\pi/\lambda)\cdot(n_2/A_{eff})$ indicates a nonlinear coefficient.

From expression (15), it is seen that, increasing the nonlinear phase shift can be realized by increasing the nonlinear refractive index $n_2$ and reducing the effective area $A_{eff}$. Since a nonlinear refractive index of germanium is larger than that of silica glass, the nonlinear refractive index $n_2$ of the optical fiber can be increased by doping a large quantity of germanium in the first core 81. In addition, the effective area $A_{eff}$ can be reduced by increasing the relative refractive index difference of the first core 81 and the cladding 84. Therefore, it is preferable to increase the refractive index of the first core 81 by doping germanium in the first core 81.

Figure 10:
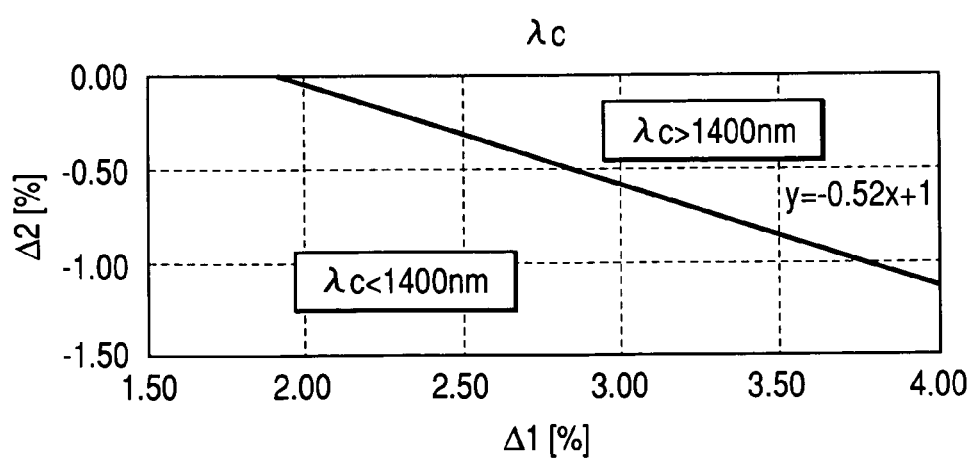
FIG. 10 is a graph showing a relation among a cut-off wavelength $\lambda c$, a relative refractive index difference $\Delta 1$, and a relative refractive index difference $\Delta 2$ according to a simulation.

Next, FIG. 10 shows simulation results of a relation among the cut-off wavelength λc, the relative refractive index difference Δ1 of the first core 81 with respect to the cladding 84, and the relative refractive index difference Δ2 of the second core 82 with respect to the cladding 84.

Here, the cut-off wavelength means the cut-off wavelength λc defined by the ITU-T (International Telecommunication Union) G.650. In addition, terms not specifically defined in this specification comply with definitions and measurement methods in ITU-T G.650.

Note that, here, the relation between Δ1 and Δ2 is indicated in the case in which D1/D2=Da is 0.5 where dispersion at the wavelength of 1550 nm is 0 ps/nm/km and also a dispersion slope at the wavelength of 1550 nm is small.

As shown in FIG. 9, it is preferable that the relative refractive index difference Δ1 of the first core 81 with respect to the cladding 84 and the relative refractive index difference Δ2 of the second core 82 with respect to the cladding 84 satisfy the following relation.

$$(\Delta 2) < -0.52 \cdot (\Delta 1) + 1$$

If the relation between the relative refractive index difference Δ1 of the first core 81 with respect to the cladding 84 and the relative refractive index difference Δ2 of the second core 82 with respect to the cladding 84 does not satisfy the above-described relation, it becomes difficult to simultaneously realize both the reduction of the absolute value of dispersion at the wavelength of 1550 nm and the reduction of the cut-off wavelength to 1400 nm or less.

Incidentally, it is necessary to reduce the relative refractive index difference Δ2 of the second core 82 with respect to the cladding 84 to −0.1% or less. This is because, when the relative refractive index difference Δ2 exceeds −0.1%, the cut-off wavelength shifts to a long wavelength, that is, increases to 1400 nm or more. Although large non-linearity is obtained by increasing germanium to be doped in the first core 81 to increase the relative refractive index difference Δ1 of the first core 81 with respect to the cladding 84, the cut-off wavelength shifts to a long wavelength if a refractive index of the first core 81 is simply increased. Therefore, Δ2 is reduced to −0.1% or less.

In addition, in the present invention, the stress imparting members 85 are provided on the opposite sides of the core 83. As the stress imparting members 85, for example, silica glass containing boron, silica glass containing germanium, or the like is used.

Since these kinds of glasses have a thermal expansion coefficient larger than that of pure silica glass, tensile distortion is caused in the stress imparting members 85 after drawing. Consequently, a stress is imparted in one direction of a core area, and maintenance of polarization is developed.

It is preferable that a relative refractive index difference Δ4 of the stress imparting members 85 with respect to the cladding 84 is −0.1% or less or 0.1% or more.

This is because, if the relative refractive index difference Δ4 is more than −0.1% and less than 0.1%, since a refractive index difference with respect to the cladding 84 decreases, it is difficult to distinguish the cladding 84 from the stress imparting members 85, which makes it difficult to recognize the position of the stress imparting members 85.

When the polarization maintaining optical fibers 810 of the present invention are connected to each other, or the polarization maintaining optical fiber 810 of the present invention and another polarization maintaining optical fibers are connected, it is necessary to perform the connection after recognizing the position of the stress imparting members 85 in order to align polarization surfaces of both the optical fibers. However, if it is difficult to identify the position of the stress imparting members 85 with respect to the cladding 84 as described above, connection work becomes difficult.

Further, as the stress imparting members 85, silica glass doped with boron is preferable. The silica glass doped with boron has a refractive index lower than that of pure silica glass.

Since it is necessary to develop the nonlinear phenomenon as large as possible in a polarization maintaining optical fiber, it is desired to increase refractive index differences of the first core 81 and the second core 82 with the cladding 84 to increase the nonlinear coefficient. In this case, the stress imparting members 85 are disadvantageous for increasing the effective area $A_{eff}$ and obtaining the large nonlinear phenomenon if a refractive index of the stress imparting members 85 provided in the cladding area is higher than that of the cladding 84. Consequently, it is preferable to use silica glass doped with boron, which has a refractive index lower than that of pure silica glass, for the stress imparting members 85.

In addition, it is more preferable that the relative refractive index difference Δ4 of the stress imparting members 85 with respect to the cladding 84 is −0.8% to −0.2%. This is because it is preferable that the relative refractive index difference of the stress imparting members 85 with respect to the cladding 84 is −0.2% or less in order to obtain non-linearity. On the other hand, if the relative refractive index difference decreases to less than −0.8%, such as −0.9%, manufacturing itself of the stress imparting members 85 is not easy.

Further, when it is assumed that a diameter of the first core 81 is D1, and an interval between the two stress imparting members 85 provided on the opposite sides of the core 83 is R as shown in FIG. 8, it is necessary to set a value of R/D1 to 2.5 to 10, more preferably, to 2.5 or more and 3.7 or less.

This is because, if R/D1 exceeds 10, polarization cross talk cannot be reduced, and a beat length cannot be reduced.

Here, as shown in FIG. 9, it is assumed that the diameter D1 of the first core 81 is a length of a line between positions, where a refractive index is equal to that of the cladding 84, in the first core 81. Further, it is assumed that the diameter D2 of the second core 82 is a length of a line connecting positions, where a refractive index is ½ of Δ2, in a boundary area of the second core 82 and the cladding 84.

Further, it is assumed that an interval R indicates a shortest interval between the two stress imparting members 85 and is a length of a line connecting positions, where a refractive index is ½ of Δ4, each other.

As afore mentioned, it is preferable to reduce R/D1 to 3.7 or less as described above because a sufficiently small polarization cross talk is obtained.

In the polarization maintaining optical fiber of this application in which a relative refractive index difference of a first core with a cladding is increased in order to increase non-linearity, a diameter of the first core 81 is small compared with a conventional single mode optical fiber. Thus, if a value of R/D1 is made too small, processing at the time when the stress imparting members 85 are provided becomes difficult. Therefore, the value of R/D1 is required to be 2.5 or more. In addition, it is not preferable to reduce R/D1 to less than 2.5 because the stress imparting members 85 are placed too close to the second core 82 or, in the worst case, brought into contact with the second core 82, whereby the working when the stress imparting members 85 are provided becomes difficult.

In addition, it is preferable that the interval R between the stress imparting members 85 is 7 µm to 17 µm. This is because, when the interval R between the stress imparting members 85 exceeds 17 µm, it becomes difficult to reduce polarization cross talk, and it also becomes difficult to reduce a beat length.

On the other hand, when the interval R between the stress imparting members 85 decreases to less than 7 µm, the stress imparting members 85 are placed too close to the second core 82, and manufacturing of the polarization maintaining optical fiber becomes difficult. More specifically, there is a problem in that, when holes are drilled in an optical fiber preform before drawing and the stress imparting members 85 are inserted into the holes in order to obtain this polarization maintaining optical fiber, the optical fiber preform is easily broken.

In addition, in the present invention, it is preferable that polarization cross talk at the length of the polarization maintaining optical fiber of 100 m and at the wavelength of 1550 nm is −20 dB or less. This is because, if the polarization cross talk exceeds −20 dB/100 m, sufficient polarization maintaining performance is not obtained.

Further, it is preferable that a beat length at the wavelength of 1550 nm is 5 mm or less. This is because, if the beat length exceeds 5 mm, it is likely that sufficient polarization maintaining performance cannot be obtained.

Moreover, it is preferable that, in the polarization maintaining optical fiber of the present invention, dispersion at the wavelength of 1550 nm is −9 to 9 ps/nm/km. This is because, in a so-called silica based optical fiber to which the polarization maintaining optical fiber of the present invention belongs, when signal processing is performed in a wavelength band centering around a wavelength of 1.55 µm called a C-band where transmission loss is minimized, the dispersion of the polarization maintaining optical fiber at the wavelength of 1550 nm less than −9 ps/nm/km, will lower the efficiency of optical signal processing utilizing the nonlinear phenomenon such as wavelength conversion or waveform shaping.

Furthermore, if the dispersion exceeds 9 ps/nm/km, efficiency of the optical signal processing utilizing the nonlinear phenomenon such as wavelength conversion or waveform shaping is lowered in the same manner. More preferably, the dispersion is −1 to 1 ps/nm/km.

It is preferable that a dispersion slope at the wavelength of 1550 nm is 0.029 ps/nm$^2$/km or less. Although the optical signal processing utilizing the nonlinear phenomenon is significantly affected by dispersion of an optical fiber as well, if the dispersion slope exceeds 0.029 ps/nm$^2$/km, wavelength dependency of dispersion increases and stable signal processing in a wide wavelength range becomes difficult.

For example, in wavelength conversion utilizing the four-wave mixing, a problem occurs in that pump wavelength dependency in a conversion band increases. The dispersion slope is more preferably 0.019 ps/nm$^2$/km or less, and yet more preferably 0.009 ps/nm$^2$/km or less.

In addition, in the polarization maintaining optical fiber of the present invention, it is preferable that bending loss in a diameter of 10 mm at the wavelength of 1550 nm is 0.1 dB/m or less. This is because, if the bending loss is 0.1 dB/m or more, it is likely that loss increases when the optical fiber is coiled.

Next, the polarization maintaining optical fiber of the present invention will be described on the basis of simulation of characteristics.

As described above, it is necessary to reduce the relative refractive index difference Δ2 of the second core 82 with respect to the cladding 84 to −0.1% or less. This is because, if the relative refractive index difference Δ2 exceeds −0.1%, the cut-off wavelength shifts to a long wavelength, that is, 1400 nm or more. Although large non-linearity is obtained by increasing germanium in the first core 81 to increase the relative refractive index difference Δ1 of the first core 81 with respect to the cladding 84, if a refractive index of the first core 81 is simply increased, the cut-off wavelength will shift to a long wavelength.

However, by reducing a refractive index difference of the second core 82, the cut-off wavelength can be prevented from shifting to a long wavelength even if a refractive index difference of the first core 81 is increased. In particular, it is preferable to reduce the relative refractive index difference of the second core 82 with respect to the cladding 84 to −0.8% or less. In order to reduce the relative refractive index difference of the second core 82 with respect to the cladding 84 to −0.8% or less, it is preferable to vitrify a silica glass soot body which becomes the second core 82, into glass in a pressurized state under an atmosphere containing fluorine or fluoride.

Now, when it is assumed that a ratio of the diameter D1 of the first core 81 and the diameter D2 of the second core 82 is D1/D2=Da, D1/D2 is required to be 0.3 to 0.8, more preferably, 0.4 to 0.7.

Concerning the polarization maintaining optical fiber of the structure shown in FIG. 8, FIGS. 11, 12, and 13 show results of simulation for changes in the dispersion slope, the effective area A$_{eff}$, and the cut-off wavelength λc, when the ratio D1/D2=Da of the diameter D1 of the first core 81 and the diameter D2 of the second core 82 is changed, that is, parameters other than the first core diameter D1 and the second core diameter D2 are fixed to the values of the embodiment 1, and the ratio D1/D2=Da of the first core diameter D1 and the second core diameter D2 is changed.

Figure 11:
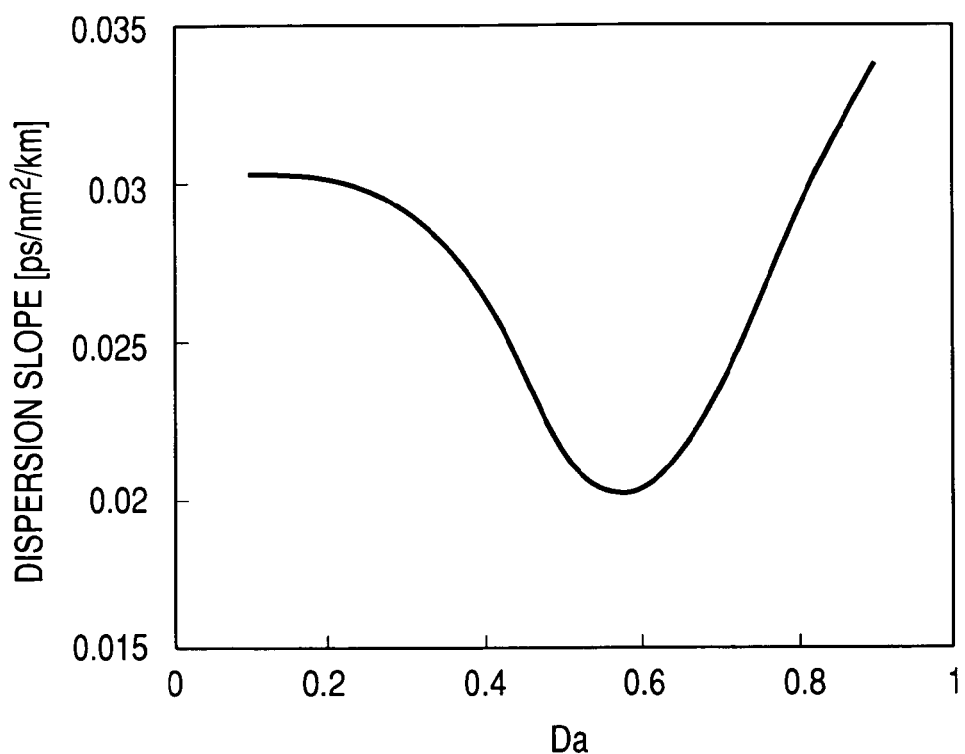
FIG. 11 is a graph showing a relation between a ratio D1/D2=Da of a first core diameter D1 and a second core diameter D2 and a dispersion slope according to a simulation.
Figure 12:
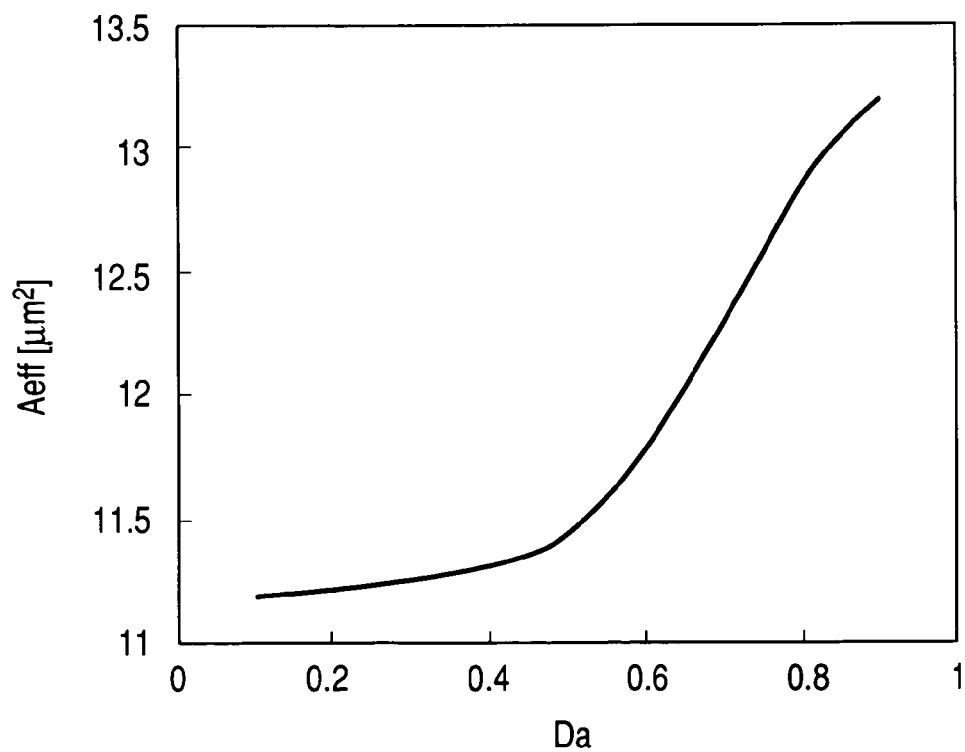
FIG. 12 is a graph showing a relation between the ratio D1/D2=Da of the first core diameter D1 and the second core diameter D2 and an effective area $A_{eff}$ according to the simulation.
Figure 13:
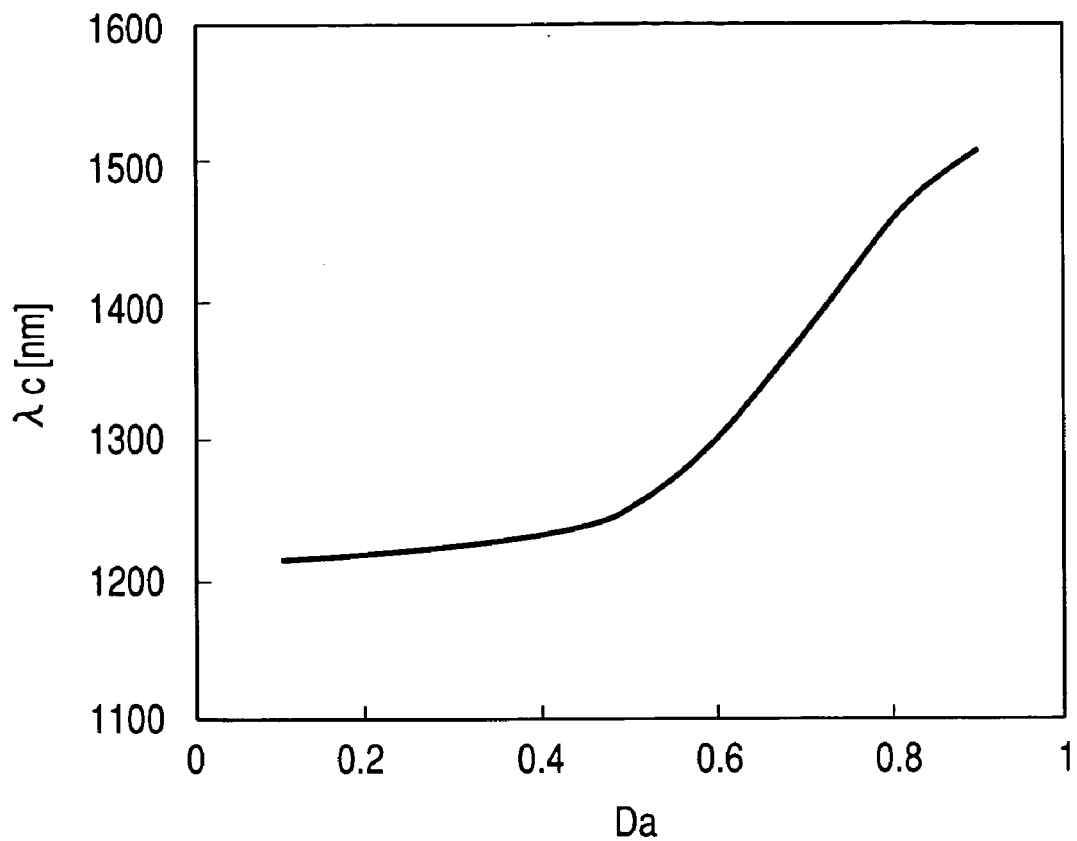
FIG. 13 is a graph showing a relation between the ratio D1/D2=Da of the first core diameter D1 and the second core diameter D2 and a cut-off wavelength $\lambda c$ according to the simulation.

Note that, in FIGS. 11 to 13, the first core diameter D1 and the second core diameter D2 are adjusted such that dispersion at 1550 nm is zero.

It is seen from FIG. 11, if Da (D1/D2) exceeds 0.8 and if Da (D1/D2) falls below 0.3, a value of the dispersion slope becomes disadvantageously larger than an allowable range.

In addition, it is seen from FIG. 12 that, as Da (D1/D2) is smaller, the effective area A$_{eff}$ decreases, that is, a mode field diameter also decreases, which is advantageous in that a high nonlinear constant is obtained. Further, it is seen that, when Da (D1/D2) exceeds 0.8, A$_{eff}$ becomes disadvantageously larger than an allowable range.

It is seen from FIG. 13 that, as Da (D1/D2) is smaller, the cut-off wavelength λc can be reduced. It is seen that, if Da exceeds 0.8, the cut-off wavelength increases to be 1400 nm or more.

Polarization maintaining optical fibers shown in embodiments B1 to B3 of table 5 and table 6 were manufactured, respectively, with taking into account the above-described simulation results. In addition, results of measuring characteristics of these manufactured respective polarization maintaining optical fibers are shown in table 7. Note that, in table 7, it is assumed that characteristics other than a cut-off wavelength indicate characteristics at the wavelength of 1550 nm.

In the polarization maintaining optical fibers of all the embodiments, polarization cross talk could be reduced to a desired small value, that is, −28 dB/100 m or less which is equal to or lower than −20 dB/100 m, and a nonlinear coefficient could be increased to a desired value, that is, 15.5/W/km or more which is equal to or higher than 15/W/km. In addition, a beat length was within a range of 4.3 to 4.7 mm and could be reduced to a desired value of 5 mm or less.

It is seen that the respective polarization maintaining optical fibers of the respective embodiments B1 to B3 have small polarization cross talk and excellent non-linearity, and therefor are preferable for optical signal processing utilizing the nonlinear optical phenomenon.

Note that manufacturing of the polarization maintaining optical fibers shown in the respective embodiments was performed by the following method. In this method, for example, a first core material, which comprises silica glass with a relative refractive index difference with respect to pure silica glass adjusted to, for example, 2% by doping of germanium, was manufactured using the VAD method. $SiCl_4$ gas was subjected to flame hydrolysis decomposition to deposit soot and form a porous body on an outer periphery of this core material. Subsequently, this porous body was heated and dehydrated in He-atmosphere containing $Cl_2$ and further heated under an atmosphere containing $SiF_4$ and He to be vitrified to transparent glass. A second core material of silica glass doped with fluorine was provided.

Moreover, $SiCl_4$ gas was subjected to flame hydrolysis decomposition to deposit soot and form a porous body on an outer periphery of this second core material. Subsequently, this porous body was heated and dehydrated in He-atmosphere containing $Cl_2$ and further vitrified to transparent glass under an atmosphere containing He. A cladding material of silica glass was provided.

In this way, an optical fiber preform was obtained in which, for example, the second core material, which was doped with fluorine having a relative refractive index difference with respect to the cladding of −1.0%, was provided on the outer periphery of the first core material having a relative refractive index difference with respect to the cladding of 2.8%, and the cladding material of silica glass was provided on the outer periphery of the second core material.

Silica glass rods were fused to opposite ends of the obtained optical fiber preform. By applying these silica glass rods to the opposite ends of the optical fiber preform in this way, occurrence of cracks and breakage in the optical fiber preform at the subsequent process are reduced.

After fusing the silica glass rods to the opposite ends of the optical fiber preform, at the parts of the fused silica glass rods, the optical fiber perform was cut such that the cut surfaces are flat surfaces vertically with respect to an axial direction of the optical fiber preform. Then, holes for inserting stress imparting members on the opposite sides sandwiching the core were drilled from the cut surfaces. Thereafter, stress imparting members of boron-doped silica glass

TABLE 5

| | Δ1 % | Δ2 % | First core α | First core diameter μm | Second core diameter μm | D1/D2 = Da | Cladding diameter μm |
|---|---|---|---|---|---|---|---|
| Embodiment B1 | 2.4 | −0.55 | 4 | 4.2 | 7.6 | 0.56 | 125 |
| Embodiment B2 | 2.9 | −1.0 | 5 | 3.6 | 9.9 | 0.365 | 125 |
| Embodiment B3 | 2.8 | −1.0 | 5 | 3.6 | 6.5 | 0.55 | 125 |

TABLE 6

| | Interval R between stress imparting members μm | Ratio R/D1 of first core diameter and interval between stress imparting members | Outer diameter of stress imparting members μm | Δ4 % |
|---|---|---|---|---|
| Embodiment B1 | 20 | 4.5 | 34 | −0.53 |
| Embodiment B2 | 16 | 4.4 | 34 | −0.53 |
| Embodiment B3 | 12 | 3.4 | 34 | −0.53 |

TABLE 7

| | Nonlinear coefficient /W/km | Dispersion ps/nm/km | Dispersion slope ps/nm²/km | Cut-off wavelength nm | Mode field diameter μm | Cross talk dB/100 m | Beat length mm | Loss dB/km | Bending loss dB/m |
|---|---|---|---|---|---|---|---|---|---|
| Measured wavelength | 1550 nm | 1550 nm | 1550 nm | | 1550 nm | 1550 nm | 1550 nm | 1550 nm | 1550 nm |
| Embodiment B1 | 15.5 | 0.3 | 0.026 | 1310 | 4.3 | −33 | 4.5 | 0.79 | 0.0 |
| Embodiment B2 | 25.1 | −0.5 | 0.024 | 1260 | 3.2 | −28 | 4.7 | 2.5 | 0.0 |
| Embodiment B3 | 24.2 | 1.3 | 0.017 | 1232 | 3.3 | −41 | 4.3 | 2.7 | 0.0 | prepared in advance, which had an outer diameter smaller than an inner diameter of the holes, were inserted into the holes.

The optical fiber preform having the stress imparting members inserted therein were guided into a preform integration furnace which was arranged above a preform input port of a drawing furnace, and heated to soften and integrate both the optical fiber preform and the stress imparting members. If temperature of the optical fiber preform integrated with the stress imparting members falls so that the optical fiber preform hardens, it is highly likely that the optical fiber preform fractures due to a large difference in thermal expansion coefficients of the optical fiber preform and the stress imparting members. Therefore, after the optical fiber preform and the stress imparting members were integrated, the integrated optical fiber preform and the stress imparting members were guided into the drawing furnace without being cooled, and were drawn to have a predetermined optical fiber outer diameter. With the above process, a polarization maintaining optical fiber was obtained.

In the drawn polarization maintaining optical fiber of glass, a resin coat of, for example, ultraviolet cured resin or thermosetting resin was provided immediately after the drawing. In the case of resin coat is the ultraviolet cured resin, the resin is applied on the outer periphery of the glass polarization maintaining optical fiber using a coating dice, and after irradiating ultraviolet rays to harden the resin, the polarization maintaining optical fiber is wound around a reel.

It is needless to mention that the manufacturing of the polarization maintaining optical fiber of the present invention is not limited to the above-described manufacturing method, and for example, as a method for forming an optical fiber preform, the existing vapor deposition method such as the MCVD, method or the OVD method are applicable other than the VAD method.

The above-described polarization maintaining optical fiber of the present invention was wound around a drum with an outer diameter of about 180 mm to obtain a wavelength converter. When characteristics of this wavelength converter was checked, the wavelength converter showed an excellent wavelength conversion characteristics over a wide wavelength band.

C: High Nonlinear Optical Fiber of a Low Transmission Loss Type

Embodiment C1

First, a first core material of silica glass with a relative refractive index difference of 2.8% with respect to pure silica by doping germanium was prepared. Silicon tetrachloride ($SiCl_4$) gas was subjected to flame hydrolysis to deposit soot and form a porous body on an outer periphery of this core material. Subsequently, this porous body was heated and dehydrated in He-atmosphere containing $Cl_2$ and further heated under an atmosphere containing $SiF_4$ and He to be vitrified to transparent glass. With this process, a second core of silica glass doped with fluorine was provided.

Next, $SiCl_4$ gas was subjected to flame hydrolysis to deposit soot and form a porous body on an outer periphery of this second core. Subsequently, this porous body was heated and dehydrated in He-atmosphere containing $Cl_2$ and further vitrified to transparent glass under an atmosphere containing He. With this process, a cladding of pure silica was formed.

In this way, an optical fiber preform was obtained which has a structure in which the second core, which was doped with fluorine having a relative refractive index of −0.55% with respect to pure silica, was provided on the outer periphery of the first core having a relative refractive index of 2.8% with respect to pure silica, and the cladding of pure silica was provided on the outer periphery of the second core.

The obtained preform was drawn by a drawing furnace to obtain an optical fiber with an outer diameter of the cladding of 90 μm. Characteristics of the obtained optical fiber are shown in the following table 8.

Embodiment C2

An optical fiber having a structure identical with that of the embodiment 1 was made in the same manner as the embodiment C1 except that the outer diameter of the cladding was of 80 μm.

Embodiment C3

An optical fiber having a structure identical with that of the embodiment C1 was made in the same manner as the embodiment C1 except that the outer diameter of the cladding was of 100 μm.

COMPARATIVE EXAMPLE C1

An optical fiber having a structure identical with that of the embodiment C1 was made in the same manner as the embodiment C1 except that the outer diameter of the cladding was of 125 μm.

COMPARATIVE EXAMPLE C2

An optical fiber having a structure identical with that of the embodiment C1 was made in the same manner as the embodiment C1 except that the outer diameter of the cladding was of 120 μm.

COMPARATIVE EXAMPLE C3

An optical fiber having a structure identical with that of the embodiment C1 was made in the same manner as the embodiment C1 except that the outer diameter of the cladding was of 130 μm.

Note that, concerning the embodiments C2 and C3 and the comparative example C1 to C3, thickness of the cladding of the preform was adjusted such that the first core diameter and the second core diameter were the same as those in the embodiment C1 when the optical fibers respectively had the outer diameters of 80, 100, 120, 125, and 130 μm.

Characteristics of the obtained optical fibers are shown in the following table 8. Note that the measuring wavelength of the characteristics is 1550 nm other than the cut-off wavelength, and the bending loss is a value in a diameter of 5 mm.

TABLE 8

|  |  |  | Embodiment C1 | Embodiment C2 | Embodiment C3 | Comparative Example C1 | Comparative Example C2 | Comparative Example C3 |
|---|---|---|---|---|---|---|---|---|
| Structure | First core Δ | % | 2.8 | 2.8 | 2.8 | 2.8 | 2.8 | 2.8 |
|  | First core diameter D1 | μm | 3.8 | 3.9 | 4.0 | 3.8 | 3.9 | 4.0 |

TABLE 8-continued

| | | | Embodiment C1 | Embodiment C2 | Embodiment C3 | Comparative Example C1 | Comparative Example C2 | Comparative Example C3 |
|---|---|---|---|---|---|---|---|---|
| | Second core Δ | % | −0.55 | −0.55 | −0.55 | −0.55 | −0.55 | −0.55 |
| | Second core diameter D2 | μm | 6.4 | 6.5 | 6.6 | 6.4 | 6.5 | 6.6 |
| | Cladding material | | Pure silica | Pure silica | Pure silica | Pure silica | Pure silica | Pure silica |
| | Cladding outer diameter | μm | 90 | 80 | 100 | 125 | 120 | 130 |
| | Resin coat diameter | μm | 145 | 130 | 150 | 250 | 245 | 250 |
| | D1/D2 | | 0.59 | 0.60 | 0.61 | 0.59 | 0.60 | 0.61 |
| Characteristics* | Loss | dB/km | 0.83 | 0.79 | 0.78 | 1.05 | 1.02 | 1.01 |
| | Nonlinear constant | ×10$^{-10}$/W | 53.2 | 51.5 | 49.7 | 51.2 | 50.8 | 49.5 |
| | Dispersion | ps/nm/km | −1.1 | −0.2 | 0.6 | −1.2 | −0.3 | 0.8 |
| | Dispersion slope | ps/nm$^2$/km | 0.0148 | 0.0166 | 0.017 | 0.0149 | 0.0165 | 0.172 |
| | Cut-off wavelength | nm | 1384 | 1416 | 1445 | 1394 | 1422 | 1449 |
| | Bending loss | dB/m | <0.05 | <0.05 | <0.05 | <0.05 | <0.05 | <0.05 |

*@1550 nm

Embodiment C4

An optical fiber of a structure shown in the following table 9 was made in the same manner as the embodiment C1 except that a first core material of silica glass with a relative refractive index difference with respect to pure silica adjusted to 2.0% by doping germanium, was used as the first core material. Characteristics of the made optical fiber are shown in the following table 9.

COMPARATIVE EXAMPLE C4

An optical fiber of a structure shown in the following table 9 was made in the same manner as the embodiment C1 except that a first core material of silica glass with a relative refractive index difference with respect to pure silica adjusted to 2.0% by doping germanium, was used as the first core material. Characteristics of the made optical fiber are shown in the following table 9.

TABLE 9

| | | | Embodiment C4 | Comparative Example C4 |
|---|---|---|---|---|
| Structure | First core Δ | % | 2.0 | 2.0 |
| | First core diameter | μm | 4.3 | 4.4 |
| | Second core Δ | % | −0.55 | −0.55 |
| | Second core diameter | μm | 7.7 | 7.8 |
| | Cladding material | | Pure silica | Pure silica |
| | Cladding outer diameter | μm | 90 | 125 |
| | Resin coat diameter | μm | 145 | 250 |
| | D1/D2 | | 0.55 | 0.55 |
| Characteristics* | Loss | dB/km | 0.33 | 0.49 |
| | Nonlinear constant | ×10$^{-10}$/W | 53.2 | 51.5 |
| | Dispersion | ps/nm/km | −0.8 | 0.3 |
| | Dispersion slope | ps/nm$^2$/km | 0.014 | 0.016 |
| | Cut-off wavelength | nm | 1150 | 1210 |
| | Bending loss | dB/m | <0.05 | <0.05 |

*@1550 nm

The measuring wavelength of the characteristics other than the cut-off wavelength is 1550 nm, and the bending loss is a value in a diameter of 5 mm. As it is evident from the above tables 8 and 9, the optical fibers of the embodiments C1 to C4 are excellent for a small transmission loss. On the other hand, it is seen that the optical fibers of the comparative examples C1 to C4 have a large transmission loss.

As described above, in the optical fiber of the present invention, the nonlinear constant $n_2/A_{eff}$ is set to $20 \times 10^{-10}$/W or more, the absolute value of the dispersion at 1550 nm is set to 20 ps/nm/km or less, the bending loss is of 0.1 dB/m or less, and the outer diameter of the cladding is set to 70 to 110 μm. Consequently, the optical fiber has both high non-linearity and a low transmission loss, and can cause the nonlinear phenomenon efficiently and realize reduction in a size. Therefore, the optical fiber is useful for optical signal processing utilizing the nonlinear phenomenon.

Figure 14:
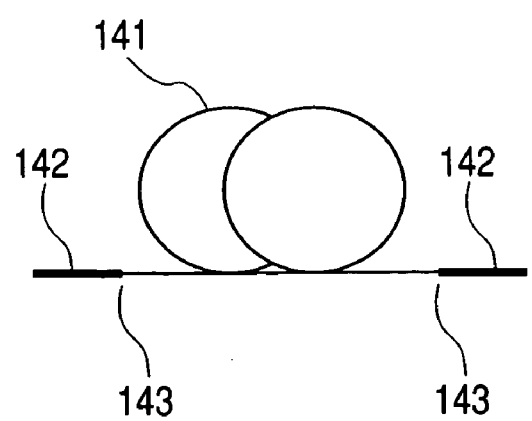
FIG. 14 is a structural diagram of a fusion-bonded fusion-spliced optical fiber of a low loss optical fiber of the present invention and with another optical fiber.
Figure 15:
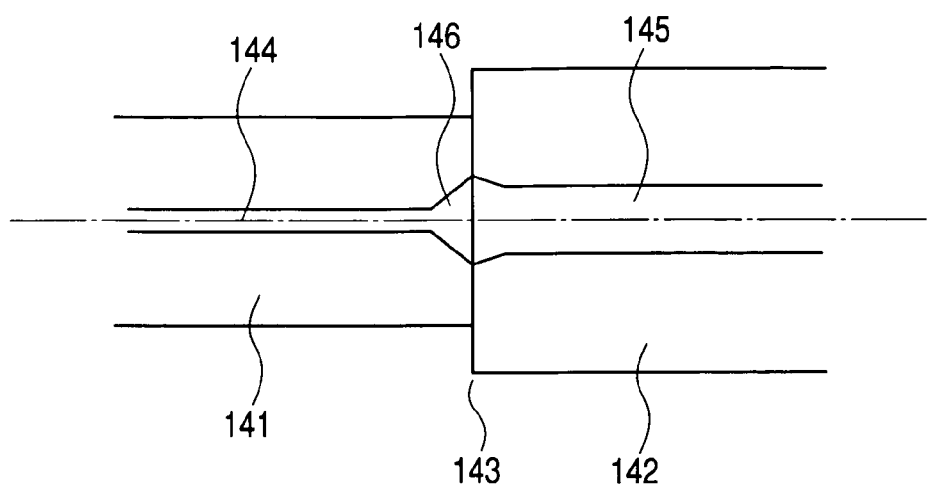
FIG. 15 is an enlarged diagram a fusion-bonded fusion-spliced part of FIG. 14.
Figure 16:
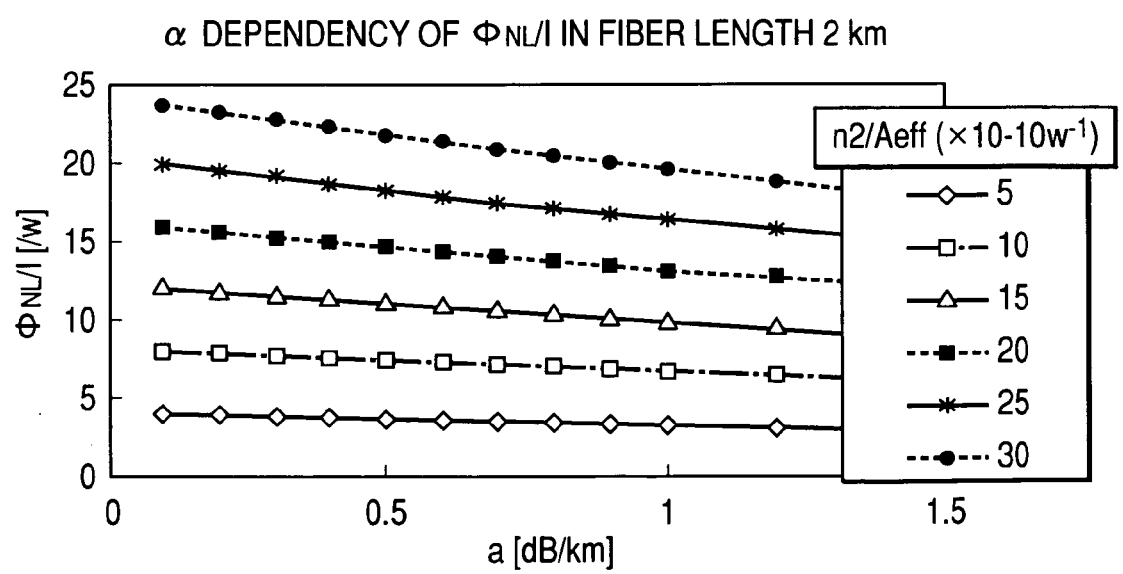
FIG. 16 is a characteristic chart showing transmission loss dependency of $\Phi NL/I$.

The optical fiber may be configured so that a single mode optical fiber or a dispersion shifted optical fiber with an outer diameter of 120 to 130 μm is fused to one end or both ends of the above-described low-loss high nonlinear optical fiber, and heat treatment is applied to the fused part(s). This configuration is shown in FIGS. 14 and 15. An optical fiber 141 of the present invention is fusion-spliced to a single mode optical fiber 142 with a cladding outer diameter of 120 to 130 μm (or a dispersion shifted optical fiber with a cladding outer diameter of 120 to 130 μm or an optical fiber with $A_{eff}$ of 20 μm$^2$ or more) at a splicing part 143. Reference numeral 144 of FIG. 15 denotes a core in the optical fiber of the present invention, 146 denotes a core of the splicing part subjected to heat treatment, and 145 denotes a core in the optical fiber 105.

When the cladding outer diameter is 70 to 110 μm, it becomes difficult to splice the optical fiber with other optical fibers on the work field, and a splicing loss increases. However, in a case where a single mode fiber or a dispersion shifted optical fiber with an outer diameter of 120 to 130 μm are fused to the high nonlinear optical fiber in accordance with the present invention with centers thereof aligned and a fused part is subjected to heat treatment, the connection work in the field is not difficult.

It is preferable that the centers of the high nonlinear optical fiber in accordance with the present invention and the optical fiber with an outer diameter of 120 to 130 µm to be fused are aligned. By aligning the centers of the respective optical fibers, a splicing loss can be reduced. In addition, it is preferable to subject the fused part to heat treatment after fusing the same. By subjecting the fused part to heat treatment after the fusing, a dopant in the core of the splicing part is diffused, and a mode field diameter is expanded. Consequently, a splicing loss at the fused part can be reduced.

In addition, in the optical fiber in accordance with the present invention, since the cladding diameter is 70 to 110 µm, an outer diameter including a resin coat can be reduced, and it is possible to wind the optical fiber compactly in a coil. A sub-system apparatus for, for example, optical 2R, optical 3R, or wavelength conversion, in which the optical fiber in accordance with the present invention is wound with a maximum winding diameter of 20 cm or less, more preferably 18 cm or less and housed, has an advantage that optical signal processing utilizing the high nonlinear phenomenon is possible and, at the same time, the apparatus is compact.

E: High Nonlinear Optical Fiber of an Efficiency Improvement Type

Embodiment E1

$SiCl_4$ gas was subjected to flame hydrolysis to deposit soot and form a porous cladding layer on a first core material of silica glass with a relative refractive index difference with respect to pure silica adjusted to 2.0% by doping germanium. Subsequently, this porous cladding layer was heated and dehydrated in He-atmosphere containing $Cl_2$ and further heated under an atmosphere containing $SiF_4$ and He to be vitrified to transparent glass.

Next, $SiCl_4$ gas was subjected to flame hydrolysis to deposit soot and form a porous cladding on this transparent glass. Subsequently, this porous cladding layer was heated and dehydrated in He-atmosphere containing $Cl_2$ and further heated under an atmosphere containing He to be vitrified to transparent glass.

In this way, an optical fiber preform was made in which a second core, which was doped with fluorine having a relative refractive index difference with respect to pure silica of −0.55%, was provided on an outer periphery of the first core material having a relative refractive index difference with respect to pure silica of 2.0%, and the cladding of pure silica was provided on an outer periphery of the second core. The ratio D of the first core diameter D1 to the second core diameter D2 is 0.56.

Figure 19:
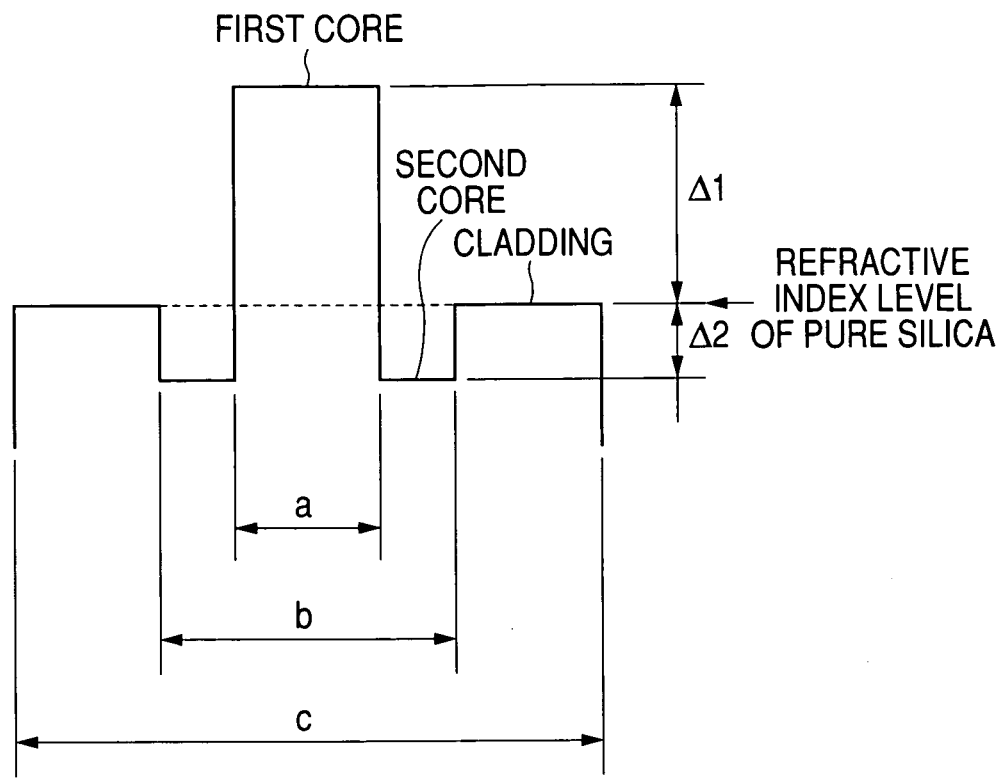
FIG. 19 is a schematic diagram showing refractive index profile shapes of prototypes D1, D2, and D4 to D6.
Figure 20:
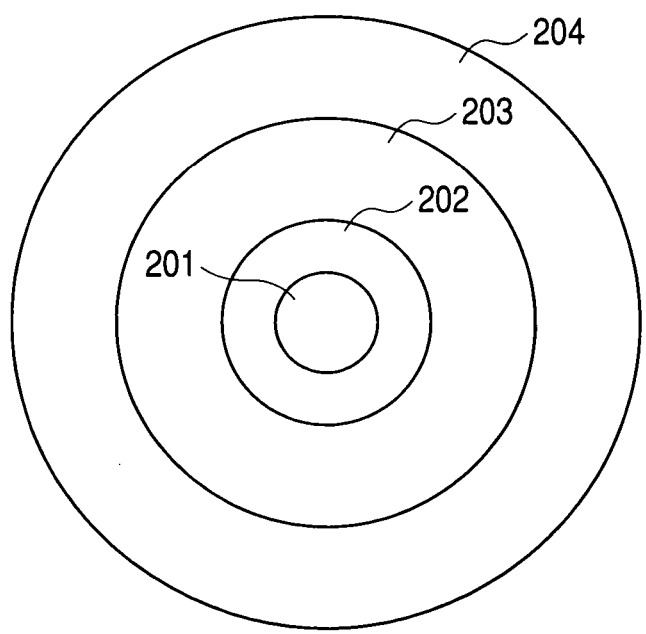
FIG. 20 is a schematic diagram showing sectional structures of the prototypes D1, D2, and D4 to D6.

The preform obtained in this way was drawn by a drawing furnace to obtain an optical fiber with an outer diameter of the cladding of 125 µm. A refractive index profile and a sectional structure of the obtained optical fiber are shown in FIGS. 19 and 20, respectively. The optical fiber comprises a first core 201, a second core 202, a cladding 203, and a resin coat 204. In addition, characteristics of the obtained optical fiber are shown in the following table 10.

Embodiments E2 and E4 to E6

Optical fibers were made in the same manner as the prototype example E1 except that a refractive index of a core material and Da (D1/D2) were changed. A refractive index profile and a sectional structure of the obtained optical fibers are shown in FIGS. 19 and 20, respectively. In addition, characteristics of the obtained optical fibers are shown in the following table 10.

Embodiment E3

$SiCl_4$ gas was subjected to flame hydrolysis to deposit soot and form a porous cladding on a core material of silica glass with a relative refractive index difference with respect to pure silica adjusted to 2.0% by doping germanium. Subsequently, this porous cladding layer was heated and dehydrated in He-atmosphere containing $Cl_2$ and further heated under an atmosphere containing $SiF_4$ and He to be vitrified to transparent glass.

Next, $SiCl_4$ gas was subjected to flame hydrolysis to deposit soot and form a porous cladding layer on this transparent glass. Subsequently, this porous cladding layer was heated and dehydrated in He-atmosphere containing $Cl_2$ and further vitrified to transparent glass under an atmosphere containing $SiF_4$ and He.

In this way, an optical fiber preform was obtained in which a cladding, which was doped with fluorine having a relative refractive index difference with respect to pure silica of −0.55%, was provided on an outer periphery of the first core having a relative refractive index difference with respect to pure silica of 2.0%.

Figure 21:
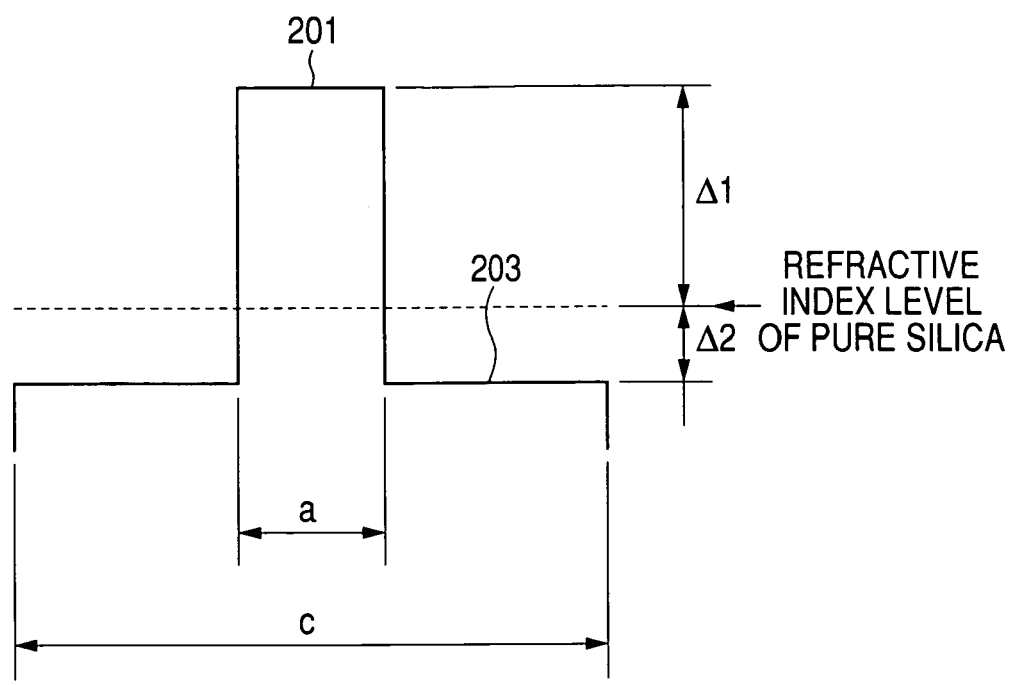
FIG. 21 is a schematic diagram showing the refractive index profile shape of the prototype D3.
Figure 22:
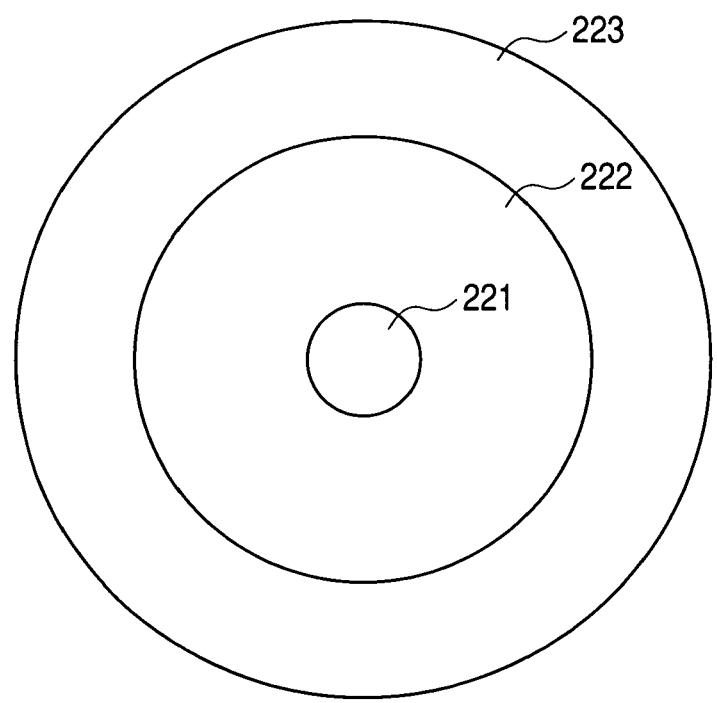
FIG. 22 is a schematic diagram showing the sectional structure of the prototype D3.

The optical fiber preform obtained in this way was drawn by a drawing furnace to obtain an optical fiber with an outer diameter of the cladding of 125 µm. A refractive index profile and a sectional structure of the obtained optical fiber are shown in FIGS. 21 and 22, respectively. The optical fiber comprises a core 221, a cladding 222, and a resin coat 223. In addition, characteristics of the obtained optical fiber are shown in the following table 10.

TABLE 10

| | | | Prototype examples | | | | | |
|---|---|---|---|---|---|---|---|---|
| | | | E1 | E2 | E3 | E4 | E5 | E6 |
| Structure/ Dimension | Δ1 | % | 2 | 2 | 2.55 | 2.8 | 2.8 | 2 |
| | First core diameter D1 | µm | 4.3 | 4.3 | 4.0 | 3.9 | 3.9 | 3.9 |
| | Δ2 | % | −0.55 | −0.55 | — | −0.55 | −0.55 | −0.55 |
| | Second core diameter D2 | µm | 7.8 | 40.5 | — | 6.5 | 6.5 | 6.5 |
| | D1/D2 | — | 0.56 | 0.1 | — | 0.6 | 0.6 | 0.4 |
| | Cladding outer diameter | µm | 125 | 125 | 125 | 125 | 90 | 125 |
| | Coat outer diameter | µm | 245 | 245 | 245 | 245 | 150 | 185 |

TABLE 10-continued

|  |  |  | Prototype examples | | | | | |
| --- | --- | --- | --- | --- | --- | --- | --- | --- |
|  |  |  | E1 | E2 | E3 | E4 | E5 | E6 |
| Characteristics (note) | Loss | dB/km | 0.48 | 0.41 | 0.35 | 0.93 | 0.86 | 0.38 |
|  | Nonlinear constant $n_2/A_{eff}$ | $\times 10^{-10}$/W | 31 | 27.6 | 33.6 | 46.9 | 59.4 | 30.4 |
|  | $(2\pi\lambda)(n_2/A_{eff})$ | /W/km | 12.6 | 11.2 | 13.6 | 19.0 | 24.1 | 12.3 |
|  | Dispersion | ps/nm/km | −0.2 | −11 | −1 | 1.5 | 0.2 | 0.1 |

(Note)
Measuring wavelength $\lambda$ is 1550 nm

Samples of the optical fiber types of the Embodiments E1 to E6 with various optical fiber lengths are shown in the following table 11.

TABLE 11

| Fiber type | Embodiment | Samples | | | | | |
| --- | --- | --- | --- | --- | --- | --- | --- |
|  |  | E1 | E2 | E3 | E4 | E5 | E6 |
| Fiber length | km | 2 | 10 | 1 | 2 | 0.6 | 20 |
| $(2\pi/\lambda)(n_2/A_{eff})$ [1 − exp(−aL)]/a (Note 1) | $W^{-1}$ | 22 | 76 | 13 | 32 | 1.4 | 118 |
| Bending loss (Note 1) (Note 2) | dB/m | <0.1 | <0.1 | <0.1 | <0.1 | <0.1 | <0.1 |

Figure 17:
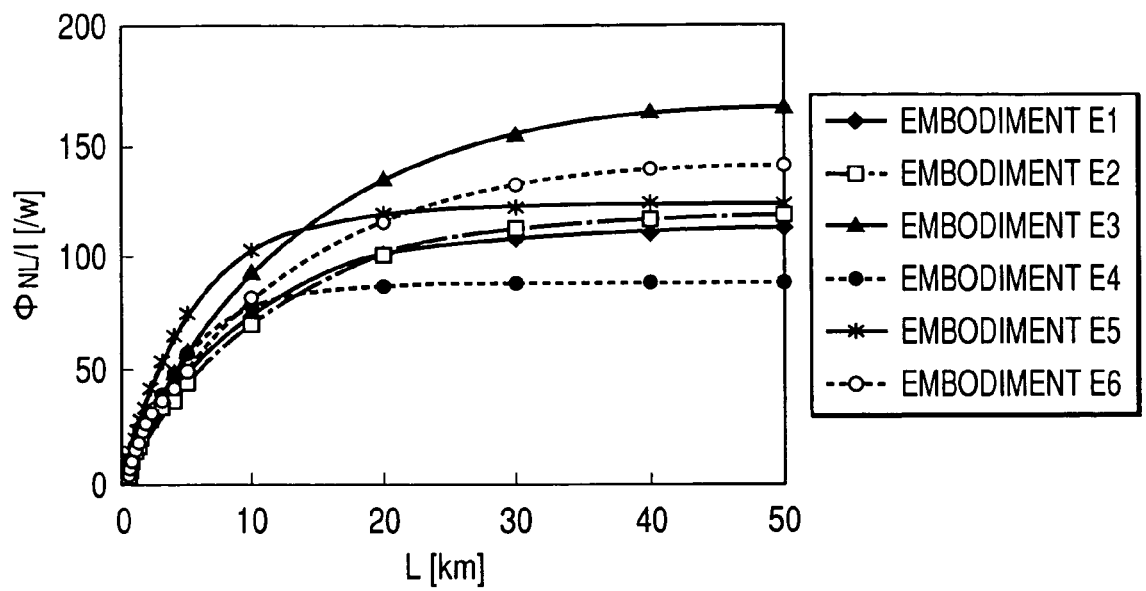
FIG. 17 is a characteristic chart showing a relation between ΦNL/I and an optical fiber length in various optical fibers.
Figure 18:
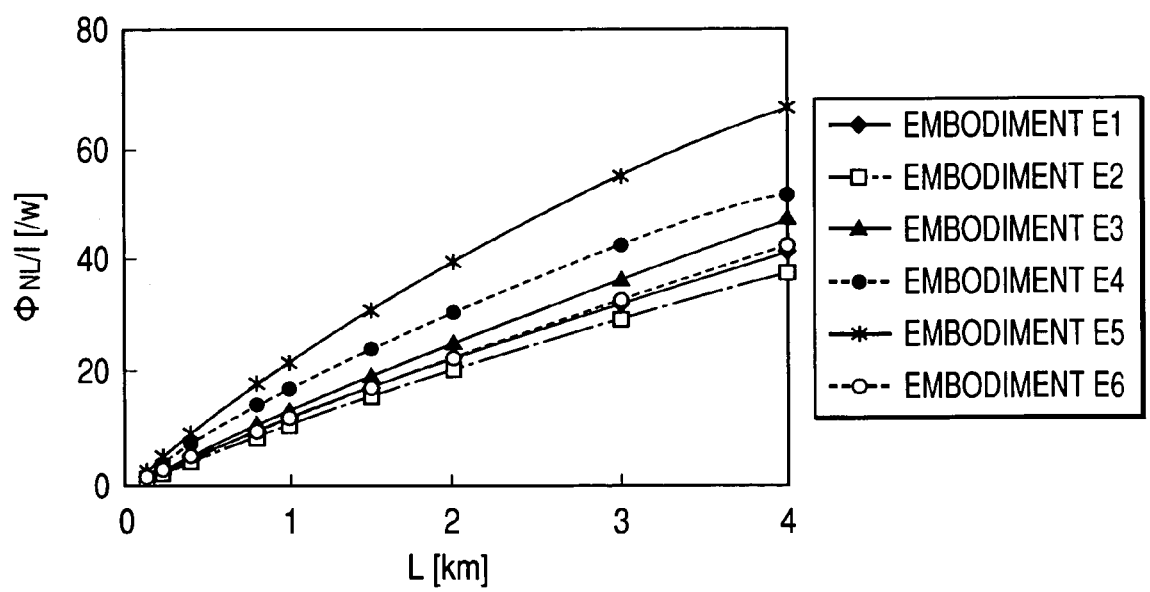
FIG. 18 is a characteristic chart showing a relation between ΦNL/I and an optical fiber length in various optical fibers.

(Note 1)
Measuring wavelength $\lambda$ is 1550 nm
(Note 2)
Wind in a diameter 5 mm When a value of $(2\pi/\lambda)(n_2/A_{eff})[1-\exp(-aL)]L/a$ (that is, ΦNL/I in self-phase modulation) is calculated for the obtained optical fiber at various fiber lengths L, calculation results are as shown in FIGS. 17 and 18.

The embodiments E1 to E3 and E6 are examples using optical fibers, for which $\gamma=(2\pi/\lambda)(n_2/A_{eff})$ is in a range of 8 to 17/W/km, is used. It is seen from FIG. 17 that, in these optical fibers, when the optical fiber length exceeds 30 km, the value of $(2\pi/\lambda)(n_2/A_{eff})[1-\exp(-aL)]/a$ hardly increases even if the optical fiber length is further extended.

The embodiments E4 and E5 are examples using optical fibers, for which $\gamma=(2\pi/\lambda)(n_2/A_{eff})$ is in a range of 17 to 27/W/km, is used. It is seen from FIG. 17 that, in these optical fibers, in a range in which optical fiber length exceeds 10 km, the value of $(2\pi/\lambda)(n_2/A_{eff})[1-\exp(-aL)]/a$ hardly increases even if the optical fiber length is further increased.

As described above in detail, according to the present invention, a value of $(2\pi/\lambda)(n_2/A_{eff})[1-\exp(-aL)]/a$ satisfies a condition of 1/W or more in a range in which $\lambda$ is 1500 nm to 1600 nm, an absolute value of dispersion at a wavelength of 1550 nm is 30 ps/nm/km or less, and a bending loss at the wavelength of 1550 nm is 0.5 dB/m or less, whereby an optical fiber, which makes it possible to perform signal processing utilizing a nonlinear phenomenon efficiently, is obtained. Further, an optical signal apparatus using such an optical fiber is constituted as shown in FIG. 7.

In addition, by setting $(2\pi/\lambda)(n_2/A_{eff})$, L, and a to predetermined ranges in the $\lambda$ range of 1500 nm to 1600 nm, an optical fiber, which makes it possible to perform signal processing utilizing the nonlinear phenomenon particularly efficiently, is obtained.

What is claimed is:

1. An optical fiber comprising a core and a cladding, wherein a dispersion slope at a wavelength of 1550 nm is −0.01 to 0.01 ps/nm²/km, a nonlinear constant at the wavelength of 1550 nm is $30\times10^{-10}$/W or more, and wherein the absolute value of dispersion at the wavelength of 1550 nm is 5 ps/nm/km or less.

2. The optical fiber according to claim 1, wherein the dispersion slope at the wavelength of 1550 nm is −0.005 to 0.005 ps/nm²/km.

3. The optical fiber according to claim 1, wherein the nonlinear constant at the wavelength of 1550 nm is $40\times10^{-10}$/W or more.

4. The optical fiber according to claim 1, wherein a cut-off wavelength $\lambda c$ is 1450 nm or less, and an effective area $A_{eff}$ is 12 μm² or less.

5. The optical fiber according to claim 4, wherein the effective area $A_{eff}$ is 10 μm² or less.

6. The optical fiber according to claim 1, wherein a difference between a maximum value and a minimum value of dispersion in a longitudinal direction of the optical fiber at one wavelength in the range of 1510 to 1590 nm is 1 ps/nm/km or less over the whole span of a length thereof in a range of 10 m to 10 km.

7. The optical fiber according to claim 6, wherein the difference between a maximum value and a minimum value of dispersion in a longitudinal direction of the optical fiber at one wavelength in the range of 1510 to 1590 is 0.2 ps/nm/km or less over the whole span of a length thereof in a range of 10 m to 10 km.

8. The optical fiber according to claim 1, wherein said core comprises a first core which has a refractive index higher than that of pure silica and a second core which is provided on an outer periphery of the first core and has a refractive index lower than that of pure silica; and said cladding is provided on an outer periphery of the second core and has a refractive index lower than that of the first core and higher than that of the second core, and an outer diameter D1 of said first core is 2 to 5 μm, and a ratio D1/D2=Da of the outer diameter D1 of said first core and an outer diameter D2 of said second core is 0.3 or more and 0.8 or less.

9. The optical fiber according to claim 8, wherein the ratio D1/D2=Da of the outer diameter D1 of said first core and the outer diameter D2 of said second core is 0.4 or more and 0.7 or less.

10. The optical fiber according to claim 8, wherein a relative refractive index difference Δ1 of said first core and with said cladding is 2.0 to 5.0%, and a relative refractive index difference Δ2 of said second core and with said cladding is −1.4 to −0.7%.

11. The optical fiber according to claim 10, wherein the relative refractive index difference Δ1 of said first core and with said cladding is 2.4 to 4.0%, and the relative refractive index difference Δ2 of said second core and with said cladding is −1.2 to −0.8%.

12. The optical fiber according to claim 8, wherein a refractive index profile of said first core is an α power profile, and α is 3.0 or more.

13. The optical fiber according to claim 8, wherein a refractive index profile of said first core is an α power profile, and α is 6.0 or more.

14. An optical signal processing apparatus comprising the optical fiber according to claim 1.

15. The optical signal processing apparatus according to claim 14, wherein the optical signal processing apparatus is an optical wavelength converter.

16. The optical signal processing apparatus according to claim 14, wherein the optical signal processing apparatus is a pulse compressor.

17. An optical fiber comprising: a core, a cladding provided on an outer periphery of said core, and two stress imparting members provided on opposite sides of said core, wherein a nonlinear coefficient at a wavelength of 1550 nm is 15/W/km or more, a cut-off wavelength is 1500 nm or less, dispersion at the wavelength of 1550 nm is −9 ps/nm/km to 9 ps/nm/km, a dispersion slope at the wavelength of 1550 nm is 0.029 ps/nm$^2$/km or less, and polarization cross talk at the wavelength of 1550 nm is −20 dB/100 m or less.

18. The optical fiber according to claim 17, wherein the cut-off wavelength is 1400 nm or less, the dispersion slope at the wavelength of 1550 nm is 0.019 ps/nm$^2$/km or less, a beat length at the wavelength of 1550 nm is 5 mm or less, and a bending loss in a diameter 10 mm at the wavelength of 1550 nm is 0.1 dB/m or less.

19. The optical fiber according to claim 17, wherein said core comprises a first core located in a central part and a second core provided on an outer periphery of said first core, said second core has a refractive index lower than that of said first core, and said cladding has a refractive index higher than that of said second core and lower than that of said first core.

20. The optical fiber according to claim 19, wherein a relative refractive index difference Δ1 of said first core with respect to said cladding is 1.8% or more, a relative refractive index difference Δ2 of said second core with respect to said cladding is −0.1% or less, a ratio R/D1 of an interval R between said stress imparting members and a diameter D1 of said first core is 2.5 to 10, and a ratio D1/D2 of the diameter D1 of said first core and a diameter D2 of said second core is 0.3 to 0.8.

21. The optical fiber according to claim 20, wherein the ratio R/D1 of the interval R between said stress imparting members and the diameter D1 of said first core is 2.5 to 3.7.

22. The optical fiber according to claim 20, wherein the interval R between said stress imparting members is 7 μm to 17 μm.

23. The optical fiber according to claim 20, wherein the ratio D1/D2=Da of the diameter D1 of said first core and the diameter D2 of said second core is 0.4 to 0.7.

24. The optical fiber according to claim 19, wherein the relative refractive index difference Δ1 of said first core with respect to said cladding and the relative refractive index difference Δ2 of said second core with respect to said cladding satisfy the following relation: (Δ2)>−0.52·(Δ1)+1.

25. The optical fiber according to claim 20, wherein the relative refractive index difference Δ2 of said second core with respect to said cladding is −0.8% or less, and a relative refractive index difference Δ3 of said first core with respect to said second core is 3.5% or more.

26. The optical fiber according to claim 17, wherein said stress imparting members are quartz silica glass added doped with boron, said cladding is quartz silica glass added doped with fluorine, and a relative refractive index difference Δ4 of said stress imparting members with respect to said cladding is −0.1% or less or 0.1% or more.

27. An optical wavelength converter, comprising the optical fiber according to claim 17.

28. An optical fiber comprising a core and a cladding, wherein a nonlinear constant $n_2/A_{eff}$ is $20 \times 10^{-10}$/W or more, an absolute value of wavelength dispersion at a wavelength of 1550 nm is 20 ps/mn/km or less, a bending loss is 0.1 dB/m or less, a wavelength dispersion slope at the wavelength of 1550 nm is 0.019 ps/nm$^2$/km or less, and an outer diameter of said cladding is 70 to 110 μm.

29. The optical fiber according to claim 28, wherein a cut-off wavelength is 1350 nm or less.

30. The optical fiber according to claim 28, wherein, a difference between a maximum value and a minimum value of dispersion in a longitudinal direction of the optical fiber at one wavelength in the range of 1510 to 1550 nm, is 3 ps/nm/km or less over the whole span of a length thereof.

31. The optical fiber according to claim 28, wherein said core has at least a first core located in a central part, said first core comprises quartz silica glass containing germanium oxide, and a relative refractive index difference of said core with respect to said cladding is 1.5% or more.

32. The optical fiber according to claim 31, wherein a relative refractive index difference of said first core with respect to said cladding is 2.5% or more.

33. The optical fiber according to claim 28, wherein said core comprises a first core located in a central part and a second core disposed on an outer periphery of said first core, said cladding comprises pure silica glass, and relative refractive index difference of said second core with respect to said cladding is −1.2 to −0.4%.

34. The optical fiber according to claim 33, wherein a relative refractive index difference of said first core with respect to said second core is 3% or more.

35. The optical fiber according to claim 33 or 34, wherein, when an outer diameter of said first core is D1 and an outer diameter of said second core is D2, D1/D2=Da is 0.3 to 0.7.

36. An optical fiber, comprising a single mode optical fiber with a cladding outer diameter of 120 to 130 μm, a dispersion shifted optical fiber with a cladding outer diameter of 120 to 130 μm, or an optical fiber with $A_{eff}$ of 20 μm$^2$ or more is fused to one end or both ends of the optical fiber according to claim 28, with centers thereof aligned and heat treatment is applied to the fused part(s).

37. An optical signal processing apparatus comprising the optical fiber according to claim 28.

38. An optical fiber, wherein, when it is assumed that $n_2/A_{eff}$ is a nonlinear constant, a is a transmission loss, λ is a wavelength, and L is a length of the optical fiber, in a range of λ of 1500 nm to 1600 nm, a value of $(2\pi/\lambda)(n_2/A_{eff})[1-\exp(-aL)]/a$ is 1/W or more, an absolute value of dispersion at a wavelength of 1550 nm is 30 ps/nm/km or less, and a bending loss in a diameter of 5 mm at the wavelength of 1550 nm is 0.5 dB/m or less.

39. The optical fiber according to claim 38, wherein, in the range of λ of 1500 nm to 1600 nm, $(2\pi/\lambda)(n_2/A_{eff})$ is 8 to 17/W/km, L is 0.5 to 30 km, and the transmission loss a is 0.2 to 0.6 dB/km.

40. The optical fiber according to claim 38, wherein, in the range of λ of 1500 nm to 1600 nm, $(2\pi/\lambda)(n_2/A_{eff})$ is 17 to 27/W/km, L is 0.01 to 10 km, and the transmission loss a is 0.4 to 2 dB/km.

41. An optical signal processing apparatus comprising the optical fiber according to claim 38.

* * * * *